(12) United States Patent
Wakizaka et al.

(10) Patent No.: US 7,833,340 B2
(45) Date of Patent: *Nov. 16, 2010

(54) COATING MATERIAL AND USE THEREOF

(75) Inventors: Yasuaki Wakizaka, Toyama (JP);
Masayuki Sanbayashi, Toyama (JP);
Jun Tanaka, Tokyo (JP)

(73) Assignee: Showa Denko K.K., Tokyo (JP)

( * ) Notice: Subject to any disclaimer, the term of this patent is extended or adjusted under 35 U.S.C. 154(b) by 562 days.

This patent is subject to a terminal disclaimer.

(21) Appl. No.: 11/578,937

(22) PCT Filed: Apr. 25, 2005

(86) PCT No.: PCT/JP2005/008333

§ 371 (c)(1),
(2), (4) Date: Oct. 19, 2006

(87) PCT Pub. No.: WO2005/103169

PCT Pub. Date: Nov. 3, 2005

(65) Prior Publication Data
US 2007/0237943 A1    Oct. 11, 2007

(30) Foreign Application Priority Data
Apr. 26, 2004 (JP) .............................. 2004-130227
Aug. 20, 2004 (JP) .............................. 2004-241299

(51) Int. Cl.
*C09D 1/00* (2006.01)

(52) U.S. Cl. ............ 106/286.4; 106/286.1; 106/287.19; 428/328; 524/497; 524/544; 524/545; 524/546; 977/773; 977/777

(58) Field of Classification Search ................. 524/497; 516/90; 106/286.1, 286.4, 287.19
See application file for complete search history.

(56) References Cited

U.S. PATENT DOCUMENTS

| | | | | |
|---|---|---|---|---|
| 4,022,742 A | * | 5/1977 | Yoshimura et al. | .......... 427/314 |
| 4,798,741 A | * | 1/1989 | Nelson | .................. 427/213.33 |
| 4,944,936 A | * | 7/1990 | Lawhorne | .................... 423/612 |
| 5,284,900 A | * | 2/1994 | Izubayashi et al. | .......... 524/492 |

(Continued)

FOREIGN PATENT DOCUMENTS

DE    4411862 A1 * 10/1995

(Continued)

OTHER PUBLICATIONS

Machine translation of Hattori et al. (JP2879364B2).*

(Continued)

*Primary Examiner*—Mark Eashoo
*Assistant Examiner*—Nicole M Buie-Hatcher
(74) *Attorney, Agent, or Firm*—Sughrue Mion, PLLC

(57) ABSTRACT

To provide a coating material capable of forming a film having both a sufficiently high film strength and a photocatalytic function by an easy method, there is provided a coating material comprising a particle group A, a particle group B and a solvent, wherein the number of necking particles of the particle group A is larger than the number of necking particles of the particle group B, wherein "the number of necking particles" here is referred to the total number of particles constituting all necking particles with each constituting particle being considered as the unit particle.

22 Claims, 4 Drawing Sheets

U.S. PATENT DOCUMENTS

| | | | | |
|---|---|---|---|---|
| 5,320,671 | A | * | 6/1994 | Schilling .................... 106/277 |
| 5,349,003 | A | * | 9/1994 | Kato et al. .................. 524/458 |
| 5,799,978 | A | * | 9/1998 | Grinnell ..................... 281/29 |
| 5,821,186 | A | * | 10/1998 | Collins .......................... 502/8 |
| 6,013,372 | A | * | 1/2000 | Hayakawa et al. ....... 428/411.1 |
| 6,121,191 | A | * | 9/2000 | Komatsu et al. ............ 502/330 |
| 6,235,270 | B1 | * | 5/2001 | Ishii et al. ..................... 424/59 |
| 6,235,388 | B1 | * | 5/2001 | Yamamoto et al. .......... 428/364 |
| 6,284,819 | B1 | * | 9/2001 | Darsillo et al. ................ 524/22 |
| 6,337,129 | B1 | * | 1/2002 | Watanabe et al. ........... 428/328 |
| 6,407,156 | B1 | * | 6/2002 | Hagihara et al. ............ 524/494 |
| 6,420,437 | B1 | * | 7/2002 | Mori et al. .................... 516/90 |
| 6,653,356 | B2 | * | 11/2003 | Sherman ....................... 516/90 |
| 2001/0043904 | A1 | | 11/2001 | Tanaka et al. |
| 2002/0025750 | A1 | * | 2/2002 | Dinwoodie ................. 442/138 |
| 2002/0131929 | A1 | * | 9/2002 | Tanaka et al. ................ 423/610 |
| 2003/0109588 | A1 | * | 6/2003 | Schmidt et al. ............... 516/20 |
| 2003/0166765 | A1 | * | 9/2003 | Sugihara ..................... 524/497 |

FOREIGN PATENT DOCUMENTS

| | | | |
|---|---|---|---|
| EP | 1148030 A1 | * | 10/2001 |
| GB | 1107161 | * | 3/1968 |
| JP | 7-155598 A | | 6/1995 |
| JP | 2879364 B2 | * | 4/1999 |
| WO | WO 03/048048 A1 | | 6/2003 |
| WO | WO 2004/028970 A2 | | 4/2004 |

OTHER PUBLICATIONS

Machine translation of Hattori, JP 2879364 B2, retrieved Aug. 21, 2008.*

* cited by examiner

COATING MATERIAL AND USE THEREOF

CROSS REFERENCE TO RELATED APPLICATION

This application is an application filed under 35 U.S.C. §111(a) claiming benefit pursuant to 35 U.S.C. §119(e)(1) of the filing date of the Provisional Application No. 60/567,008 filed on May 3, 2004, and the filing date of the Provisional Application No. 60/604,488 filed on Aug. 26, 2004, pursuant to 35 U.S.C. §111(b).

TECHNICAL FIELD

The present invention relates to a coating material used for a photocatalytic film having high performance, a film produced using the coating material, and uses of the film.

BACKGROUND ART

The technique used for film formation in general includes a dry process and a wet process. Examples of the dry process include those of performing the film formation in a vacuum container, such as sputtering, and examples of the wet process include those of performing the film formation by using a coating material or by using plating or the like of effecting electrolytic or electroless deposition. Among these, in particular, the technique of performing the film formation by using a coating material requires no special equipment such as vacuum device, is easily after-applied, can be used over a wide range from laboratory scale to industrial mass production under similar conditions and by virtue of these characteristic features, is being used for imparting a design property to an article by the use of an ink, paint or the like, or imparting functions such as photocatalysis and corrosion resistance.

In such a coating material, for example, a particle group H blended for imparting an objective function such as photocatalytic ability, a component I for binding the particle group H to assure the strength as a film, a solvent J or the like for preparing a coating material from these, and an additive K for enhancing the dispersion stability and coatability as a coating material are blended in many cases.

The binding component I is not necessary in the case of using a relatively high temperature to allow melt-bonding of the particle group H as described in JP-A-07-155598, but the technique of using a high temperature has a problem that when the temperature of allowing for melt-bonding of the particle group H is very high as in ceramics, the application is limited only to a substrate having a melting point high enough to endure such a high temperature. Moreover, in the case of applying the film for creating an added value in a product already processed into a certain desired state or applying the film to a large member such as building material on site, the film-forming condition of 300° C. or more is not practical.

In this way, it is sometimes difficult to obtain a film having a practical strength by using only a particle group H but not using a binding component I. Therefore, an organic or inorganic binding component I capable of imparting the strength at a lower temperature is generally used.

As the ratio of the binding component I to the particle group H becomes larger, the film may have a higher strength. However, with increased blending ratio of the binding component I, the originally intended photocatalytic ability of the particle group H is generally inhibited. Furthermore, the active site of the particle group H for expressing the photocatalytic function is a chemically singular point in many cases, and the binding component I in particular often preferentially adheres thereto. Accordingly, in terms of the purpose of assuring the film strength and causing the film to satisfactorily exert the objective function, there is a trade-off relationship between the amount of the particle group H and the amount of the binding component I. In addition, the binding component I is expensive in many cases as compared with the particle group H, and its use in a large amount is not preferred.

As described above, the film-forming method using a coating material is useful but suffers from a problem that in order to form a film having a sufficiently high strength, the concentration of a substance irrelevant to the expression of function, such as binder, must be elevated and in turn, the photocatalytic ability of the particle group H is inhibited.

An object of the present invention is to provide a coating material capable of forming a film having both a sufficiently high film strength and a photocatalytic function by an easy method.

SUMMARY OF THE INVENTION

As a result of intensive investigations on the coating material so as to attain the above-described object, the present inventors have found that when a necking particle group A and a less necking-particle group B are synthesized and blended, a coating material having excellent coatability and capable of satisfactorily exerting the function of the particle group H and forming a film having a strength high enough to endure the practical use can be obtained. The present invention has been accomplished based on this finding.

That is, the present invention provides the following inventions.

(1) A coating material comprising a particle group A, a particle group B and a solvent, wherein the number of necking particles of the particle group A is larger than the number of necking particles of the particle group B, wherein "the number of necking particles" here is referred to the total number of particles constituting all necking particles with each constituting particle being considered as the unit particle. For example, if m particles are connected to form a first necking structure and n particles are connected to form a second necking structure, the number of necking particles of the first and second necking structures is (m+n).

(2) The coating material as described in (1) above, wherein the metal oxide particle group A has a necking structure formed by connection of m particles and the metal oxide particle group B has only 0.2 m or less connected particles.

(3) The coating material as described in (2) above, wherein the average primary particle diameter of the particle group A is from 7 to 200 nm in terms of the BET specific surface area-reduced value.

(4) The coating material as described in any one of (1) to (3) above, wherein in the particle size distribution of the particle group A, the distribution constant by the Rosin-Rammler formula is 1.5 or more.

(5) The coating material as described in any one of (1) to (4) above, wherein the particle group A comprises titanium oxide.

(6) The coating material as described in any one of (1) to (5) above, wherein the average particle diameter of the particle group A is from 50 nm to 3 μm as measured by using a laser diffraction-type particle size distribution meter.

(7) The coating material as described in any one of (1) to (6) above, wherein the particle group A comprises titanium oxide synthesized by a vapor phase process of oxidizing titanium tetrachloride with an oxidative gas at a high temperature.

(8) The coating material as described in any one of (1) to (7) above, wherein the particle group A contains ultrafine particulate titanium oxide obtained by reacting a titanium tetrachloride-containing gas and an oxidative gas after preheating each gas at 500° C. or more and the ultrafine particulate titanium oxide has an average primary particle diameter of 7 to 500 nm in terms of the BET specific surface area-reduced value.

(9) The coating material as described in any one of (1) to (8) above, wherein the particle group A comprises titanium oxide synthesized by supplying a titanium tetrachloride-containing gas and an oxidative gas each preheated to 500° C. or more to a reaction tube each at a flow velocity of 10 m/sec or more.

(10) The coating material as described in (9) above, wherein the titanium oxide of the particle group A is synthesized by causing the titanium tetrachloride-containing gas and the oxidative gas to stay in the reaction tube for 1.0 second or less under a high-temperature condition that the temperature inside the reaction tube exceeds 600° C.

(11) The coating material as described in (9) or (10) above, wherein the titanium oxide of the particle group A is synthesized by setting the average flow velocity of the gases in the reaction tube to 5 m/sec or more.

(12) The coating material as described in any one of (7) to (11) above, wherein the titanium oxide of the particle group A is synthesized by supplying the preheated titanium tetrachloride-containing gas and oxidative gas into the reaction tube to cause turbulence.

(13) The coating material as described in any one of (7) to (12) above, wherein the titanium oxide of the particle group A is synthesized by incorporating from 10 to 100% of titanium tetrachloride into the titanium tetrachloride-containing gas.

(14) The coating material as described in any one of (7) to (13) above, wherein the titanium oxide of the particle group A is synthesized by preheating the titanium tetrachloride-containing gas and the oxidative gas at a temperature of 800° C. or more.

(15) The coating material as described in any one of (1) to (14) above, wherein the average primary particle diameter of the particle group B is from 4 to 100 nm in terms of the BET reduced value.

(16) The coating material as described in (15) above, wherein the average particle diameter of the particle group B is from 4 to 2,000 nm as measured by a laser diffraction-type particle size distribution meter.

(17) The coating material as described in (16) above, wherein the average particle diameter of the particle group B is from 8 to 100 nm as measured by a laser Doppler-type particle size distribution meter.

(18) The coating material as described in any one of (15) to (17) above, wherein the particle group B comprises titanium oxide synthesized by hydrolyzing an aqueous titanium compound solution in water.

(19) The coating material as described in any one of (15) to (18) above, wherein the particle group B comprises titanium oxide synthesized by a production process of adding dropwise an aqueous titanium tetrachloride solution in water.

(20) The coating material as described in (19) above, wherein the titanium oxide of the particle group B is synthesized by a production process of adding dropwise an aqueous titanium tetrachloride solution in water at an elevated temperature from 50° C. to the boiling point.

(21) The coating material as described in any one of (1) to (20) above, wherein the ratio X/Y of the mass X of the particle group A to the dry mass Y of the particle group B is from 0.01 to 0.2.

(22) The coating material as described in any one of (1) to (21) above, wherein assuming that the mass of the particle group A is X, the dry mass of the particle group B is Y and the mass of the entire coating material is Z, the solid content concentration (X+Y)/Z is from 0.005 to 0.1.

(23) A metal oxide-containing coating material comprising a particle group Ba and a particle group Aa, wherein in the mass particle size distribution by the laser Doppler method, the particle group Ba has a peak at 8 to 400 nm, and the particle group Aa has a peak at 800 to 5,500 nm.

(24) The coating material as described in (23) above, wherein in the mass particle size distribution by the laser Doppler method, the particle group Ba has a peak at 20 to 300 nm, and the particle group Aa has a peak at 1,200 to 4,000 nm.

(25) The coating material as described in (23) or (24) above, wherein in the mass particle size distribution by the laser Doppler method, assuming that the integrated area of the particle group Ba is BaS and the integrated area of the particle group Aa is AaS, the ratio AaS/BaS is from 0.05 to 1.

(26) A metal oxide-containing coating material, wherein a peak Ab is present at least at 1 to 4 μm in the mass particle size distribution by the laser diffraction method and the primary particle diameter is from 7 to 50 nm as reduced from the BET measured value of the dry powder of the coating material.

(27) A coating material comprising a titanium oxide synthesized by a vapor phase process of oxidizing titanium tetrachloride with an oxidative gas at a high temperature, a titanium oxide synthesized by hydrolyzing an aqueous titanium compound solution in water, and a solvent.

(28) The coating material as described in (27) above, wherein the ratio of the dry mass between the titanium oxide synthesized by a vapor phase process of oxidizing titanium tetrachloride with an oxidative gas at a high temperature and the titanium oxide synthesized by hydrolyzing an aqueous titanium compound solution in water is from 0.01 to 0.2.

(29) The coating material as described in any one of (1) to (28) above, which contains an inorganic binder.

(30) The coating material as described in any one of (1) to (29) above, which contains an organic binder.

(31) The coating material as described in (29) above, which contains a zirconium compound in the inorganic binder.

(32) The coating material as described in any one of (1) to (31) above, which contains a fluorine-containing resin.

(33) The coating material as described in (32) above, which the fluorine-containing resin comprises polytetrafluoroethylene.

(34) The coating material as described in (32) or (33) above, wherein the particle diameter of the fluorine-containing resin is from 0.01 to 2 μm.

(35) The coating material as described in (34) above, wherein the particle diameter of the fluorine-containing resin is from 0.05 to 0.5 μm.

(36) The coating material as described in any one of (32) to (35) above, wherein a surfactant is contained in an amount of 0.5 to 10 mass % based on the weight of the fluorine-containing resin.

(37) The coating material as described in (36) above, wherein the surfactant is a nonionic surfactant.

(38) The coating material as described in any one of (1) to (37) above, which can form a film having a hardness of H or more in a pencil hardness test when dried under heat at 200° C. or less.

(39) The coating material as described in any one of (1) to (38) above, wherein the solid content concentration in the coating material is 10 mass % or more.

(40) The coating material as described in any one of (1) to (39) above, wherein titanium oxide occupies 50 mass % or more of the solid content.

(41) The coating material as described in (40) above, wherein titanium oxide occupies 60 mass % or more of the solid content.

(42) The coating material as described in any one of (32) to (41) above, wherein assuming that the content of the inorganic binder out of the binders blended in the coating material is Iw [g] in terms of the 120° C.-dried solid matter and the content of the fluorine-containing resin is Fw [g] in terms of the 120° C.-dried solid matter, Iw/Fw is from 0.05 to 20.0.

(43) The coating material as described in any one of (1) to (42) above, which contains from 10 ppm to less than 2,000 ppm of an anionic surfactant.

(44) The coating material as described in any one of (1) to (43) above, which contains from 10 ppm to less than 2,000 ppm of a cationic surfactant.

(45) The coating material as described in any one of (1) to (44) above, which contains from 2 ppm to less than 2,000 ppm of a nonionic surfactant.

(46) The coating material as described in (44) above, which contains from 2 ppm to less than 50 ppm of a nonionic surfactant.

(47) The coating material as described in any one of (1) to (46) above, wherein titanium oxide and a partial hydrolysate of alkoxysilane are contained as solid contents.

(48) The coating material as described in any one of (1) to (47) above, wherein an inorganic binder and a ceramic fiber having a diameter of 0.5 to 10 μm in an amount of 5 to 100 mass % based on the titanium oxide are contained.

(49) A coating material capable of forming a photocatalytic film having b/a of 0.5 or more with the assumption that when the coating material is coated in an area of 56.25 cm$^2$ and the coating film is contaminated under irradiation with light of 10,000 lux at 20° C. and a relative humidity of 50% for 12 hours in 5 L of an $SO_2$ gas diluted with air to 50 ppm, and then subjected to an acetaldehyde gas removal test at 20° C. and a relative humidity of 50% in 500 ml of a gas containing 500 ppm of acetaldehyde, the removal ratios before and after contamination are a % and b %, respectively.

(50) The coating material as described in any one of (1) to (49) above, wherein a photocatalytic fine particle is contained, and a physical adsorbent comprising active alumina, A-type zeolite, Y-type zeolite or active carbon is blended in an amount of 10 to 200 mass % based on the photocatalytic fine particle.

(51) The coating material as described in (50) above, wherein the active alumina, A-type zeolite, Y-type zeolite or active carbon has a particle diameter of 5 nm to 5 μm.

(52) The coating material as described in any one of (1) to (51) above, wherein a photocatalytic fine particle is contained, and one or more member selected from the group consisting of a copper oxide, an iron oxide, a manganese oxide and a zinc oxide is contained as a chemical trapping agent in an amount of 0.01 to 200 mass % in terms of the metal based on the photocatalytic fine particle.

(53) The coating material as described in any one of (1) to (52) above, wherein a photocatalytic fine particle is contained, and one or more member selected from the group consisting of an alkaline earth metal chloride, an alkaline earth metal carbonate and an alkaline earth metal hydrogencarbonate is contained as a chemical trapping agent in an amount of 0.01 to 200 mass % in terms of the metal based on the photocatalytic fine particle.

(54) The coating material as described in (53) above, wherein the alkaline earth metal chloride is a chloride of calcium, strontium or barium.

(55) The coating material as described in any one of (1) to (53) above, which a photocatalytic fine particle is contained, and at least one selected from the group consisting of a nickel oxide, a cobalt oxide and a molybdenum oxide is contained in an amount of 0.1 to 200 mass % based on the photocatalyst particle.

(56) The coating material as described in (55) above, wherein a platinum metal or compound is further contained and the sum of weights of the nickel oxide, cobalt oxide and molybdenum oxide is from 20 to 10,000 mass % based on the platinum metal.

(57) The coating material as described in (55) or (56) above, wherein the platinum, the compound of platinum, and the transition metal oxide have a d50 particle diameter of 10 nm to 10 μm.

(58) A process for producing a coating material, comprising a step of mixing a metal oxide particle group A having a necking structure formed by connection of m particles, a metal oxide particle group B having only 0.2 m or less connected particles, and a solvent.

(59) A process for producing a film, comprising coating and drying the coating material as set forth in any one of (1) to (57) above and having a solid content concentration of 5 mass % to less than 35 mass % as a first-time coating material, and coating and drying thereon a coating material comprising the particle group B and a binder and having a solid content concentration of ½ or less of that of the first-time coating material.

(60) A film formed of the coating material as set forth in any one of (1) to (57) above.

(61) The film as described in (60) above, wherein the film has an average film thickness of 50 to 30,000 nm.

(62) The film as described in (60) above, wherein the film has an average film thickness of 50 to 2,000 nm.

(63) The film as described in (60) above, wherein the film has an average film thickness of 1/10 to 5 times the aggregate particle diameter of the particle group A.

(64) An article having provided on the surface or in the inside thereof the film as set forth in any one of (60) to (63) above.

(65) An article as described in (64) above, having at least one function selected from the group consisting of photocatalytic functions such as deodorization, antifouling and antibacterial effect.

(66) The article as described in (64) or (65) above, which is at least one member selected from the group consisting of building material, lighting equipment, decorative windowpane, machine, vehicle, glass product, home appliance, agricultural material, electronic device, cellular phone, tool, tableware, bath goods, water purifying apparatus, toilet goods, furniture, clothing, cloth product, fiber, leather product, paper product, resin product, sporting goods, bedding, container, spectacle, billboard, piping, wiring, metal fitting, hygiene material, automobile equipment, stationery, emblem, hat, bag, shoe, umbrella, window shade, balloon, fluorescent lamp, LED, signal, street light, toy, road sign, ornament, outdoor product such as tent and cooler box, artificial flower, objet d'art, filter and deodorizing filter.

BRIEF DESCRIPTION OF DRAWINGS

In FIG. 1, reference mark a denotes a necking and β denotes a contact point.

BEST MODE FOR CARRYING OUT THE INVENTION

The present invention is described in detail below.

Figure 1:
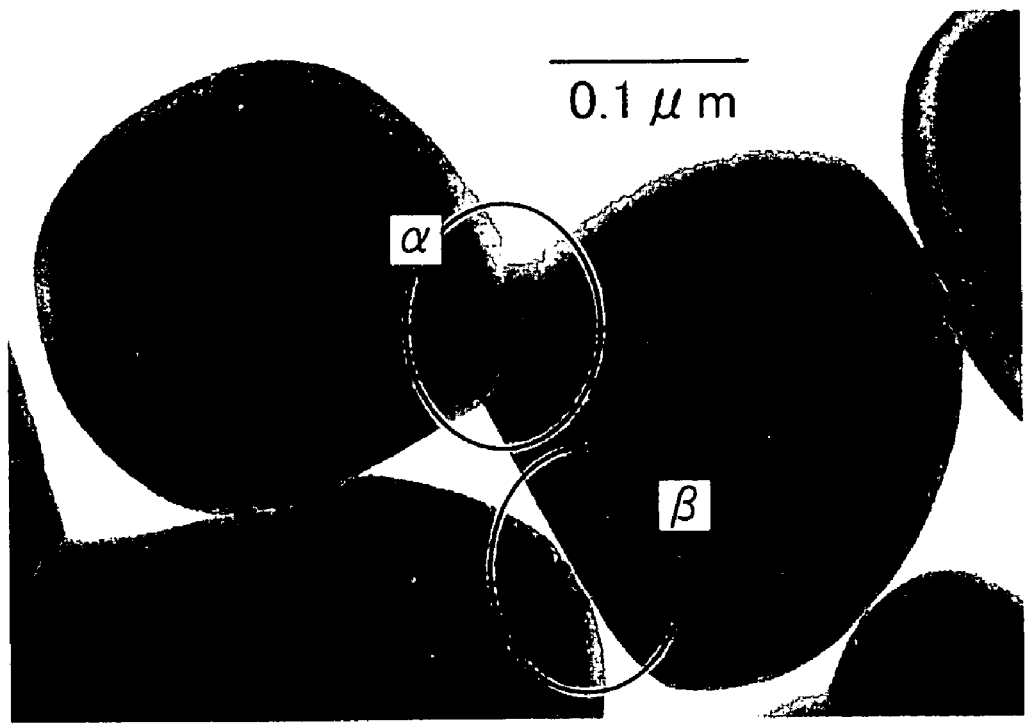
FIG. 1 is an SEM photograph of necking particles.

The coating material in a preferred embodiment of the present invention comprises a particle group A comprising particles having many necking structures, a particle group B having less-necking structures as compared with the particle group A or having utterly no necking structure, and a solvent containing these particles. That is, the present invention provides a coating material comprising a particle group A, a particle group B and a solvent, wherein the number of necking particles of the particle group A is larger than the number of necking particles of the group B. Also, the coating material in a preferred embodiment of the present invention comprises a titanium oxide synthesized by the vapor phase process of oxidizing titanium tetrachloride with an oxidative gas at a high temperature, a titanium oxide synthesized by hydrolyzing an aqueous titanium compound solution in water, and a solvent. The characteristic feature in a preferred embodiment of the present invention is in that a particle group A having a structure of particles being necked with each other is blended in an optimal amount in the coating material. One index for judging the necking of the particle group A is the fact that when the particle group is observed by TEM, as shown in FIG. 1, not only a portion "β" where particles are merely point-contacted but also a portion "α" where particles are plane-contacted and give a continued titanium oxide particle appearance are observed.

When the coating material in a preferred embodiment of the present invention is used, a coating material having the following preferable properties for the formation of a photocatalytic film can be produced.

(a) Film Having High Strength can be Formed:

One of the properties required of the photocatalytic film is high film strength. The photocatalyst is often applied to a surface of a substrate or produce for creating an added value in the substrate or product which is already processed into a certain state. In this case, the photocatalytic film is exposed to an environment in contact with the exterior and if the film does not have sufficiently high strength, film separation occurs, as a result, the effect cannot be maintained and depending on the manner of separation, the design property may be impaired.

Figure 2:
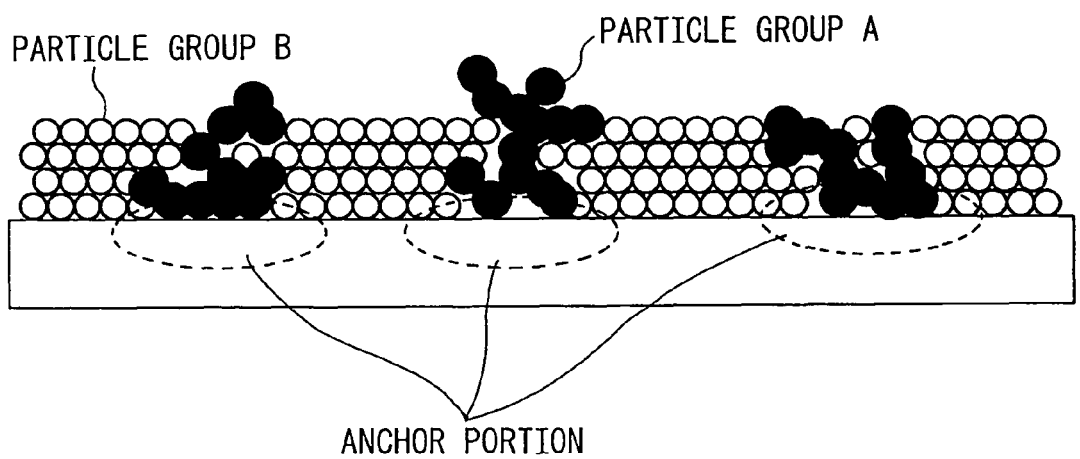
FIG. 2 is a conceptual view of the film according to the present invention.

In the coating material according to a preferred embodiment of the present invention, the particle group A preferably has a necking structure. The photocatalytic film obtained from this coating material is fixed to a substrate in such a manner that, as shown in FIG. 2, some points of the necking structure of the particle group A come into contact with the substrate surface. By blending the particle group A having such an anchor effect, the film strength is enhanced. As another effect, the particle group A is considered to have a function of decreasing the freedom degree of the particle group B by forming a three-dimensional structure, that is, a function as a framework supporting the entire film structure.

(b) Binding Component Amount can be Decreased:

In the case of containing a particle group having a necking structure, the amount of the binding component can be decreased by the portion of the necking structure contained, nevertheless, the film strength is enhanced. The film strength is enhanced also from the above-described reasons. Therefore, the film can be formed by decreasing the amount of the binding component I as compared with conventional film formation techniques or by not using the binding component at all. As a result, the inhibitory effect of the binding component on the properties of the particle group H can be minimized or nullified.

(c) Film Having High Photocatalytic Ability can be Formed:

In the coating material according to a preferred embodiment of the present invention, the binder amount can be decreased and therefore, the photocatalytic ability of the particle group H can be fully exerted. The photocatalytic film is required to be a porous film because the liquid or gas as an object of decomposition must be contacted with the photocatalytic particle group H. Furthermore, in order to increase the charge separation efficiency of holes and electrons generated upon excitation of the photocatalyst, high crystallinity is also required. The surface crystal of the particle having necking in a preferred embodiment of the present invention is continued to an adjacent particle without losing the properties as a particle and this enables formation of a photocatalytic film having a longer-distance crystalline order than that of a sole particle. As for the continued photocatalytic component, a technique of adding a metal oxide nanotube (see, Electrochemistry, Vol. 70, page 418 (2002)) or the like is known. The crystallinity may be enhanced by the use of a nanotube, but chemically active properties are generally difficult to bring out on the side wall of a tube structure. The mode of the particle group A where the particles are taking a necking structure is preferred for the photocatalytic film, because the active surface as a photocatalyst is unhidden. Also, the particle group A in a preferred embodiment of the present invention can be characterized in that the aggregate particle diameter is larger than the average film thickness. In this case, it is considered that a part of the aggregate particle protrudes from the film and a particle group having high photocatalytic ability pokes its head out of the film, as a result, the film can exert high photocatalytic performance.

(d) Film Having High Transparency and No Interference Color can be Formed:

In general, when the dimension of a particle blended at the film formation exceeds ½ of the wavelength of light, interference or scattering of light takes place and interference color appears or white tinting occurs. In the case of the particle group A for use in the present invention, even when the average particle diameter of aggregate particles becomes as large as 1 to 2 μm due to necking, the primary particle diameter $D1$ is sufficiently small for the wavelength in the visible light region and the film does not give a heavily white-tinted appearance in practice. Furthermore, it is noteworthy that when a film is formed by using the coating material of the present invention, interference color does not appear in the film. If a film is formed by using only a particle group B having less necking and the film is formed to a thickness of 100 nm to 1 μm, the generation of interference color can hardly be prevented. Although the mechanism is not particularly known, when the coating material of the present invention is used, interference color does not appear even with a film thickness of 200 to 800 nm in which range very strong interference color is originally observed. The reason therefor is considered because a particle having a diameter exceeding 1 μm in terms of the aggregate particle diameter is contained in the particle group A and a part of the aggregate particle protruding from the formed film surface appropriately controls the roughness of the surface and acts to prevent the interference of light which is encountered in the case of a smooth film.

(e) Enhancement of Coatability:

The characteristic features required of the photocatalytic coating material are described above by referring to respective items. However, not only the performance as the photocatalyst but also thixotropic and leveling properties allowing for easy wetting or no uneven coating are necessary. Considering the wettability or dispersion of the particle group, when the particle group H is, for example, a titanium oxide-based particle, a solvent having a relatively high vapor pressure at an ordinary temperature, such as alcohol, is used in many cases. At this time, if only the particle group B is contained to a proportion of about 5% in terms of the solid content, the drying of the coating material after coating is difficult to control and a liquid dripping or uneven coating mark is liable to remain and gives rise to reduction of strength and deterioration of design property. On the other hand, the coating material containing the particle group A in a preferred embodiment of the present invention is excellent in the thixotropic and leveling properties and liquid-holding property after coating, and partial occurrence of uneven drying and in turn, generation of liquid dripping mark can be prevented. The reason why such improvement of properties and prevention of rapid drying can be obtained when the particle group A is blended is not clearly known, but it is considered that the complicated necking structure formed in the particle group A takes part in improving the coatability of coating material and holding the liquid.

(f) Reduction of Tack Property:

The photocatalytic film in general has high tack property and when the film surface is stroked by a hand, touching is not smooth. This is considered to occur due to chemical affinity or physical interaction between the photocatalyst surface and the hand. Therefore, if the photocatalytic film has high tack property, even a soft material such as hand may cause film separation. The strength test of photocatalytic film includes a pencil strength test assuming that a sharp-pointed material contacts with the film, but even in the case of a film having sufficiently high strength in this pencil strength test, when the film has tack property, film separation sometimes occurs on rubbing with a hand. The film containing the particle group A of the present invention is decreased in the tack property and causes less separation when rubbed with a plane. The mechanism of decreasing the tack property is not clearly known, but it is considered that a part of the particle group A protrudes from the film, whereby the smooth film attributable to the particle group B and the rubbing medium such as palm are prevented from contacting with each other on respective planes.

As described above, the characteristic feature in a preferred embodiment of the present invention is in that the particle group A is contained in the coating material. The coating material may have a low viscosity allowing for spray coating, dip coating or flow coating or may have a high viscosity allowing for coating by a squeegee method or a doctor blade method.

The particle group A and the particle group B preferably have an appropriate degree of necking. In the system where the particle group A, the particle group B and a binder component are present, it can be confirmed by using a laser Doppler-type particle size distribution meter that the particle size distribution has at least two peaks. In the present invention, the particle size distribution is preferably defined by using ELS-800 (manufactured by Otsuka Electronics Co., Ltd.). The measuring method is described below. A measurement sample is diluted with a guaranteed ethanol (produced by Kanto Chemical Co., Inc.) to a powder concentration of 0.07 mass %, and 150 ml of the resulting solution is weighed into a 200 ml-volume PYLEX-made glass vessel and irradiated for 1 minute by using an ultrasonic cleaner, iuchi ultrasonic cleaner VS-70U (output: 65 W, water bath volume: 800 ml), to obtain a sample. The liquid sample is filled to a normal amount indicated on a polystyrene-made angular cell, Ultra-Vu Disposable Cuvettes (produced by Elkay), having an inner dimension of 10-mm square and measured. The variables set at the measurement are as follows.

The measurement system is set at a constant temperature of 25° C. and the Malcat method is used for the distribution analysis. The number of integrations is 100. The measurement mode is a time interval method. The sampling time is 20 $\mu$sec and the number of intake channels is 512. By using the homodyne method, the optimal light quantity, minimum light quantity and maximum light quantity are set to 10,000, 5,000 and 20,000, respectively. The analysis is performed with an ethanol viscosity of 1.10 cP, a refractive index of 1.3595 and a dielectric constant of 24.5. In the initial setting of the apparatus, the results of the coarse particle side become small due to the dust cut function, but in this measurement, the dust cut function is turned off because the particle group A sometimes appears in the portion of several $\mu$m. At the time when the fluctuation of intensity measured by a scattering intensity monitor falls within 20% on the 100 count, the measurement is started. The ratio of the particle group A to the particle group B is determined by area-integrating the mass distribution of particles.

In order to keep the structure and express the properties described above, the particle group A (Aa) having a relatively large particle diameter defined as above preferably has a particle size distribution of 800 nm or more in the coating material. If the particle diameter is too large, the particle protrudes from the film and this causes film separation. Therefore, this particle group preferably exhibits a particle size distribution having a peak at 5,500 nm or less in the coating material. However, the particle group exhibiting such a particle size distribution is sheared and deflocculated at the coating and may be present as a particle smaller than that in the coating film. The particle group B (Ba) having a relatively small particle diameter is preferably present in the coating material to have a particle size of 8 to 400 nm. This particle group is preferably close to a primary particle so as to fill voids of the particle group A, but since a binder component is present in the coating material, it is difficult in practice for this particle group to be present in a completely primary particle state. This particle group may be aggregated and measured as a particle having a particle diameter tens of times the primary particle. The particle size distribution of the particle group A preferably has a peak at a position of 1,200 to 4,000 nm, and the particle size distribution of the particle group B preferably has a peak at a position of 20 to 300 nm.

As for the particle group A (Aa) contained in the coating material, its particle size distribution can also be defined by using a laser diffraction-type particle size distribution meter SALD-2000J (manufactured by Shimadzu Corporation). When measured by using a laser diffraction-type distribution meter, the peak of the particle group B observed by using a laser Doppler-type particle size distribution meter is close to the lower limit in the particle size measurement and probably because of this, the peak is sometimes not clearly observed, but at least the particle group A (Aa) contained in the coating material can be specified. The measuring method by a diffraction-type particle size distribution meter is described below.

A sample is diluted with a guaranteed ethanol to a concentration of 0.05 mass % and the diluted sample is charged into a measuring system until the diffraction light intensity by SALD-2000J reaches the measurement region. At this time, the measuring system is also thoroughly displaced and filled with ethanol in advance. The analysis is performed with a powder refractive index of 2.50 to 0.1i (i is an imaginary number).

When the particle group for use in the present invention is measured by this method, a peak is present at least at 1 to 4 μm in the volume particle size distribution. When a peak is present at 1 μm or more, the coating material can readily exert the properties (a) to (f) of the present invention, but if the peak position exceeds 4 μm, the particle protrudes from the film formed of the coating material and this sometimes causes film separation. In order to fully exert the properties (a) to (f), the peak position is preferably from 1.2 to 3 μm.

In the coating material according to a preferred embodiment of the present invention, the particle comprises a particle having many necking structures and a particle less having a necking structure. In this case, the dry powder of the coating material, that is, the mixture of the particle group A and the particle group B, preferably has an average primary particle size of 7 to 50 nm as reduced from the BET specific surface area. The calculation method is shown by formula (2) later. If a particle of less than 7 nm is intended to produce, this may encounter difficulty in the production, whereas if the primary particle size exceeds 50 nm, the haze of the film prepared from the coating material increases and the film properties may be impaired.

The coating material can be produced by blending the raw material of particle group A and the raw material of particle group B.

In the case where m particles in the particle group A are connected to form a necking structure, the number of connected particles in the particle group B is preferably ½ or less (that is, 0.5 m or less), more preferably ⅕ or less (0.2 m or less), of the number of connected particles in the particle group A. As for the particle group B, even when primary particles are as-is present without undergoing necking at all, the purpose in the present invention can be achieved. More specifically, the number of necking particles in the particle group B is preferably from 0.000000001 m to 0.2 m on average, more preferably from 0.0000001 m to 0.1 m on average. The number of necking particles in the particle group A may be determined by the observation through a microscope such as TEM and SEM, but the number of particles is very large and the visual field of the microscope is limited. Therefore, assuming that the particle diameter by the laser diffraction-type particle size distribution meter is DL (a so-called D50 value), the tap density (a measured value according to JIS K-5101-20.2) is P, the primary particle diameter by the BET method is D1 and the true density of titania is ρ, the number m of necking particles is determined by the following formula:

$$m = \frac{P \times (4/3)\pi(DL \times 1/2)^3}{\rho \times (4/3)\pi(D1 \times 1/2)^3} \quad (1)$$

In the measurement of the DL value of the raw material powder, a laser diffraction-type particle size distribution meter is used similarly to the measurement of particle size distribution of the coating material, but the measuring method differs as follows because the objective is powder.

An aqueous 10% sodium hexametaphosphate solution (100 μl) is added to 50 ml of a water slurry containing titanium oxide in an amount of 0.05 g in terms of powder and irradiated with ultrasonic waves (46 KHz, 65 W) for 3 minutes. This slurry is measured for the particle size distribution by using a laser diffraction-type particle size distribution meter (SALD-2000J, manufactured by Shimadzu Corporation).

The primary particle diameter D1 of the particle group A or particle group B means an average primary particle diameter determined according to formula (2) from the specific surface area as measured by the BET method in terms of the specific surface area of a spherical particle.

$$D1 = 6/\rho S \quad (2)$$

wherein ρ is a true density of particle, and S is a specific surface area of particle.

The number of necking particles in the particle group B can be analyzed by the particle size distribution, TEM or the like, but it is preferred to measure the particle size distribution. The particle diameter of the particle group B is close to the lower limit of the measurement range by the laser diffraction-type meter and for performing an exact analysis, the above-described laser Doppler-type particle size distribution meter is used. The sample is also prepared by the same method as described above for the measurement using ELS-800. However, the sol is not formed into dry particles, but a sample in the sol state is diluted as-is to a normal concentration and used as the measurement sample. Assuming that the particle diameter of giving a highest scattered light intensity is DL and the tap density of dry powder is P, the number m of necking particles is determined according to formula (1).

In many cases, the particle groups A and B for use in the present invention each differs in the aggregated state between when the particle group A is alone measured for the particle size distribution and when the particle groups A and B and if desired, a binder are mixed and measured for the particle size distribution.

The average primary particle diameter of the particle group A as calculated by formula (2) is preferably from 7 to 200 nm. If the average primary particle diameter is less than 7 nm, the particle may be used but costs highly due to bad productivity of the particle group A. Also, if the particle diameter exceeds 200 nm, the particle may be used, but the degree of scattering of light increases and a transparent film can be hardly obtained from the coating material containing this particle group.

The particle group A and the particle group B are in many cases differing in the particle size distribution, but considering the filling, film uniformity and the like, the raw material particularly of the particle group A preferably has a certain degree of particle size uniformity.

The particle size uniformity can be specified by the distribution constant (n) determined according to the Rosin-Rammler formula. The Rosin-Rammler formula is briefly described below, but details thereon are described in Ceramic Kogaku Handbook (Handbook of Ceramic Engineering), 1st ed., pp. 596-598, compiled by The Ceramic Society of Japan.

The Rosin-Rammler formula is represented by the following formula (3):

$$R = 100\exp(-bD^n) \quad (3)$$

wherein D is a particle diameter, R is a percentage of the number of particles larger than D (particle diameter) to the number of all particles, and n is a distribution constant.

Here, when $b=1/De^n$, formula (3) can be rewritten as follows:

$$R=100\exp\{-(D/De)^n\} \qquad (4)$$

wherein De is a particle size characteristic number, and n is a constant called a distribution constant.

From formula (3) or (4), the following formula (5) is obtained.

$$\log\{\log(100/R)\}=n\log D+C \qquad (5)$$

wherein C is a constant. From formula (5), when log D and log {log(100/R)} are graduated on the x axis and the y axis, respectively, of the Rosin-Rammler (RR) chart and the relationship therebetween is plotted, a nearly straight line is obtained. The gradient (n) of this straight line indicates the degree of uniformity of the particle size. As the numerical value of n is larger, the particle size uniformity is judged as excellent.

In the fine particulate titanium oxide as a raw material for use in the present invention, the 90% cumulative mass-particle size distribution diameter D90 is preferably 4 μm or less, more preferably 3 μm or less, and the distribution constant n by the Rosin-Rammler formula is preferably 1.5 or more, more preferably from 1.8 to 20.

The metal oxide particle group obtained by a so-called vapor phase process of reacting a metal halide or the like with an oxidative gas such as oxygen at a high temperature has high crystallinity due to high heat history at the synthesis and also has a necking bond. Furthermore, in the vapor phase process, a powder having a relatively narrow primary particle size distribution is obtained as compared with other production methods and therefore, when this powder is used as the particle group A or B, a primary particle size distribution preferred as the metal oxide structure of the present invention is readily obtained. The primary particle diameter of the particle group A for use in the present invention is not particularly limited but is generally from 7 to 200 nm, preferably from 7 to 150 nm, more preferably from 10 to 100 nm. The particle group A is not particularly limited as long as it is a metal compound particle exhibiting photocatalytic ability, and may be, for example, zinc oxide, titanium oxide, zirconium oxide, cadmium sulfide, potassium tantalate, strontium titanate, cadmium selenide, niobium oxide, iron oxide, tungsten oxide or tin oxide but is preferably titanium oxide having high catalytic ability and low toxicity.

The vapor-phase grown titanium oxide which is preferably used in the present invention is not particularly limited, but titanium oxide containing an anatase-type crystal or brookite-type crystal is preferred. In the case of containing an anatase-type crystal, the titanium oxide may be an anatase-type titanium oxide alone or may additionally contain a rutile-type titanium oxide. In the case of arbitrarily containing a rutile-type titanium oxide in addition to the anatase-type titanium oxide, the ratio of the anatase type in the titanium oxide is not particularly limited but is usually from 1 to 100 mass %, preferably from 20 to 100 mass %, more preferably from 50 to 100 mass %, because the anatase-type titanium oxide is more easily dispersed in a solution to facilitate use as a raw material of the coating material.

The production method of general titanium oxide by the vapor phase process is known and not particularly limited, but when titanium tetrachloride is oxidized by using an oxidative gas such as oxygen or water vapor under a reaction condition of about 1,000° C., fine particulate titanium oxide is obtained. Examples of the preferred reaction mode include the production method described in WO01/16027 pamphlet. The production method of titanium oxide used as a raw material in the present invention is described in more detail below.

The growth mechanism of particle in the vapor phase process is roughly classified into two types. One is CVD (chemical vapor deposition) and another is growth by collision (coalescence) or sintering of particles. In order to obtain ultrafine particulate titanium oxide as an objective in the present invention, the particle growth time is preferably made short in either case. More specifically, in the former growth, the growth can be suppressed, for example, by elevating the preheating temperature and enhancing the chemical reactivity (reaction rate). In the latter growth, the growth by sintering or the like can be suppressed by swiftly performing cooling, dilution or the like after the completion of CVD and thereby reducing the high-temperature residence time as much as possible.

In the vapor phase process of producing titanium oxide by oxidizing a titanium tetrachloride-containing gas with an oxidative gas at a high temperature, the titanium tetrachloride-containing gas and the oxidative gas each is preferably preheated to 500° C. or more, because the CVD growth can be suppressed. A fine particulate titanium oxide having a BET specific surface area of 3 to 200 m$^2$/g, preferably from 50 to 150 m$^2$/g, can be obtained and used as the raw material.

The gas containing titanium tetrachloride working out to a raw material preferably has a titanium tetrachloride concentration of 10 to 100%, more preferably from 20 to 100%. When a gas having a titanium tetrachloride concentration of 10% or more is used as a raw material, many uniform nuclei are generated or reactivity is elevated, as a result, the formation of particles grown by CVD control difficulty occurs and particles having a narrow particle size distribution can be obtained.

The gas for diluting titanium tetrachloride in the titanium tetrachloride-containing gas is preferably selected from those of neither reacting with titanium tetrachloride nor being oxidized. Specific examples of the preferred diluting gas include nitrogen and argon.

The preheating temperature of the titanium tetrachloride-containing gas and oxidizing gas is preferably 500° C. or more, more preferably 800° C. or more. If the preheating temperature is less than 500° C., this gives rise to less generation of uniform nuclei and low reactivity and therefore, particles having a broad particle size distribution are obtained.

In introducing the titanium tetrachloride-containing gas and oxidizing gas into a reaction tube, the flow velocity is preferably 10 m/sec or more, because by increasing the flow velocity, the mixing of two gases is accelerated. The flow velocity is more preferably from 20 to 200 m/sec, still more preferably from 50 to 150 m/sec. When the temperature at the introduction of gases into a reaction tube is 500° C. or more, the reaction is completed at the same time with mixing, so that the generation of uniform nuclei can be increased and the zone where particles grown by CVD control are formed can be shortened.

The raw material gas is preferably introduced into a reaction tube so as to attain thorough mixing of the gases introduced into the reaction tube. The fluid state of gas within the reaction tube is not particularly limited as long as the gases are thoroughly mixed, but, for example, a fluid state causing turbulence is preferred. Also, a spiral vortex may be present therein.

As for the introduction nozzle for introducing the raw material gas into the reaction tube, a nozzle of giving a coaxial parallel flow, an oblique flow, a cross flow or the like is employed, but the present invention is not limited thereto. A coaxial parallel flow nozzle is generally preferred in view of design because the structure is simple, though this nozzle is inferior in the mixing degree to the nozzles of giving an oblique flow or a cross flow.

For example, in the case of a coaxial parallel flow nozzle, the titanium tetrachloride-containing gas is preferably introduced into the inner tube. In this case, the inner tube diameter is preferably 50 mm or less, more preferably 30 mm or less, from the standpoint of mixing the gases.

The gases introduced into the reaction tube each preferably flows at a high flow velocity within the reaction tube so as to attain complete mixing of gases. Particularly, the flow velocity is preferably 5 m/sec or more, more preferably 8 m/sec or more, in terms of the average flow velocity. When the gas flow velocity within the reaction tube is 5 m/sec or more, thorough mixing can be attained in the reaction tube. Also, particles grown by CVD control are less generated and this prevents production of particles having a broad particle size distribution.

The reaction within the reaction tube is an exothermic reaction, and the reaction temperature is higher than the sintering temperature of fine particulate titanium oxide produced. Therefore, unless the reaction product is rapidly cooled after the reaction, sintering of the produced fine particles proceeds to give grown particles, despite release of heat from the reactor. In the case of obtaining ultrafine particulate titanium oxide of less than 10 $m^2/g$, it is preferred that the high-temperature residence time within the reaction tube exceeding 600° C. is suppressed to 1 second or less, more preferably 0.5 seconds or less, and the reaction product is rapidly cooled. For rapidly cooling the particles after the reaction, for example, a method of introducing a large amount of cooling air or gas such as nitrogen into the reaction mixture or spraying water is employed.

When the 90% cumulative mass-particle size distribution diameter D90 in the particle size distribution as measured by the above-described method is small, the synthesized titanium oxide is judged to reveal good dispersibility in a hydrophilic solvent. Also, the fine particulate titanium oxide produced by such a method is excellent in the particle size uniformity. Furthermore, the fine particulate titanium oxide used as the raw material in the present invention preferably comprises, as the main phase, an anatase-type crystal or a brookite-type crystal.

The raw material of the particle group A in a preferred embodiment of the present invention is preferably produced continuously in the process of synthesizing the titanium oxide. One reason therefor is because this is advantageous in view of production cost. Also, it is expected that when necking is continuously effected at the generation of titanium oxide crystals at around 1,000° C., adjacent particles are synthesized under almost the same conditions and undergo necking as-is, as a result, a particle group A in the state of a larger number of crystals being continued is advantageously formed. If the particles are fired in a container by not using the continuous process, these particles are readily melt-bonded to form a lump and the object of using a porous body can be hardly achieved.

The coating material in a preferred embodiment of the present invention exerts its properties by the effect of interaction between the particle group A and the particle group B described above.

The titanium oxide preferably used as the raw material of the particle group B is not particularly limited in its synthesis method but can be produced, for example, by the following method.

The raw material of the particle group B can be produced by the method described in JP-A-11-43327. In particular, as described in Journal of Material Chemistry, Vol. 11, page 1116 (2001), the synthesis of a sol containing brookite crystals having good dispersibility is presumed to pass through an intermediate chloride and the control of chlorine concentration and temperature at the synthesis is important. For this purpose, a system starting from titanium tetrachloride of generating hydrogen chloride upon hydrolysis is preferred, and an aqueous titanium tetrachloride solution is more preferred. In order to maintain an optimal chlorine concentration at the synthesis, the hydrogen chloride may be prevented from dissipation outside the system by a technique such as application of pressure, but a most effective method is to perform the hydrolysis by using a reflux condenser in the hydrolysis reaction tank. The brookite crystal-type titanium oxide may be obtained from a metal alkoxide raw material or the like even in an organic solvent by adjusting the hydrochloric acid concentration and water concentration, but in view of easy control of reaction and cost of raw material, the reaction medium is preferably water.

The temperature at the hydrolysis is preferably a temperature from 50° C. to the boiling point of the aqueous titanium tetrachloride solution. If the temperature is less than 50° C., the hydrolysis reaction takes a long time. The hydrolysis is performed by elevating the temperature to this range and holding it for approximately from 10 minutes to 12 hours. This holding time can be shorter as the temperature at the hydrolysis is present on the higher temperature side. In the hydrolysis of the aqueous titanium tetrachloride solution, a mixed solution of titanium tetrachloride and water may be heated to a predetermined temperature in the reaction tank or after previously heating water in the reaction tank and adding titanium tetrachloride thereto, the temperature may be elevated to a predetermined temperature. By this hydrolysis, a brookite crystal-containing titanium oxide can be obtained. In order to elevate the brookite-type titanium oxide content, a method of previously heating water in a reaction tank to a temperature of 75° C. to boiling point, adding titanium tetrachloride thereto, and performing the hydrolysis at a temperature of 75° C. to boiling point is preferred. As the titanium oxide particle in the brookite crystal-containing titanium oxide sol is smaller, the titanium oxide thin film can have higher transparency. Also, in view of affinity for solvent, the titanium oxide particle is preferably crystalline.

However, an excessively small titanium oxide is difficult to produce. Therefore, the BET specific surface area of the titanium oxide particle in the sol is preferably from 20 to 400 $m^2/g$, more preferably from 50 to 350 $m^2/g$, still more preferably from 120 to 300 $m^2/g$. Also, the average primary particle diameter as calculated from the BET specific surface area is preferably from 4 to 100 nm, more preferably from 5 to 70 nm, still more preferably from 5 to 40 nm. At the blending in the coating material, the particle group B may be blended in the sol state as-is or may be once dried and then blended, but in view of dispersibility of the entire coating material, this particle group is preferably blended in the sol state as-is in the coating material.

The brookite crystal-containing titanium oxide sol immediately after synthesis may aggregate and precipitate when the ion intensity remaining in the solution is large, but by passing the synthesized brookite crystal-containing titanium oxide through a washing step such as filtration using an electrodialysis desalting device or an ultra-filtration membrane, more complete dispersion can be obtained. The particle group B is expected to, as shown in FIG. 2, intrude into voids of the particle group A at the film formation and form a film and therefore, its aggregate particle diameter is preferably small to a certain extent. However, if the primary particle diameter is from several nm to tens of nm, the primary particles readily aggregate and can be hardly dispersed as required. Accordingly, the aggregate particle diameter has a preferred range. That is, the preferred range of the aggregate particle diameter is from 4 to 2,000 nm, more preferably from 7 to 1,000 nm, still more preferably from 10 to 500 nm, in terms of the peak of light scattering intensity as measured by the above-described method using a laser Doppler-type particle diameter distribution meter.

The coating material of the present invention is greatly characterized by the necking of the particle group A, but the aggregate particle sometimes becomes large due to the necking as compared with the primary particle and has an aggregate particle diameter of 1 μm or more. In this case, if too many particles of the particle group A are present, when the coating material uses a water or low-viscosity organic solvent, precipitation of the particle group A readily occurs. Even if the particle group is precipitated, the particles can be easily dispersed by shaking the coating material and there is no problem in the coating, but if the precipitation rate is too high, the handling is cumbersome. Also, a sufficiently high film strength can be hardly obtained only by the particle group A undertaking a role of supporting the structure and in order to allow for filling of the particle group B in voids of the particle group A distributed in the film, a certain amount of the particle group B is necessary. For this purpose, the particle group A preferably satisfies the condition that X/Y is 0.2 or less, wherein X is the mass of the particle group A and Y is the dry mass of the particle group B. Here, the dry mass is defined as a mass of a solid remaining after the sol containing the particle group B is dried at 120° C. for 24 hours. In order to bring out the properties owing to the group A, that is, enhancement of coatability, elevation of film strength and formation of film having high photocatalytic ability, the ratio X/Y of the particle group A to the particle group B in the coating material is preferably 0.01 or more, more preferably from 0.1 to 0.18.

Assuming that the mass of the particle group A is X, the dry mass of the particle group B is Y and the mass of the entire coating material is Z, the solid content concentration (X+Y)/Z is preferably from 0.005 to 0.1. If the ratio (X+Y)/Z is less than 0.005, a sufficiently large amount of photocatalytic particles may not remain on the substrate after the film formation and a satisfactory photocatalytic performance is sometimes difficult to exert. The coating material of the present invention exhibits excellent coatability even at a high concentration as compared with conventional products, but if the solid content concentration exceeds 0.25, a thick film is formed and due to difference in the drying rate between the outermost face of the film and the contact face on the substrate side, a stress is readily generated to cause cracking in the film, as a result, a sufficiently high film strength can be hardly maintained. The ratio (X+Y)/Z is more preferably from 0.01 to 0.15.

Also, in the coating material according to a preferred embodiment of the present invention, when the particle group A and the particle group B are present to satisfy the conditions that X/Y is from 0.01 to 0.2 and (X+Y)/Z is from 0.005 to 0.1, the effect of the present invention is obtained even if a metal oxide particle group C having a necking structure where the number of connected particles is intermediate between m and 0.2 m is additionally present. The presence of the particle group C is preferred in some cases but is not essential and assuming that the mass of the particle group C is P, P/X is preferably 1.5 or less, more preferably 1 or less. If the amount of the particle group C is too large, the aggregate particle diameter totalizing the blended particle groups A, B and C becomes large and a uniform film may be difficult to obtain. Furthermore, the same bad effects as in the case of blending too many particles of the particle group A are caused in some cases.

In the present invention, when an inorganic binder is used, a film having high solvent resistance and good high-temperature properties by itself can be formed. Examples of the inorganic binder include Zr compounds, Si compounds, Ti compounds and Al compounds. Specific examples thereof include zirconium compounds such as zirconium oxychloride, zirconium hydroxychloride, zirconium nitrate, zirconium sulfate, zirconium acetate, ammonium zirconium carbonate and zirconium propionate; silicon compounds such as alkoxysilane, partial hydrolysate of alkoxysilane with mineral acid, and silicate; metal alkoxides of aluminum, titanium or zirconium, and partial hydrolysates thereof with mineral acid; and those obtained by selecting multiple metal species from alkoxides of aluminum, silicon, titanium or zirconium, and compounding or hydrolyzing them. Among these, zirconium compounds are preferred.

The film strength is sometimes more improved by blending an artificial glass fiber, a rockwool, a slug wool or the like. The average diameter of such a ceramic fiber is preferably from 0.5 to 10 μm, more preferably from 2 to 6 μm. Also, the fiber diameter is preferably from 1/11 to 1/1, more preferably from 1/4 to 1/2, of the film thickness after film formation. When the fiber content is 5 mass % or more based on the metal oxide particle as a main component for imparting the function to the film, the film strength can be enhanced. The amount of the fiber blended is preferably 100 mass % or less, because if it exceeds 100 mass %, the function of film may decrease or since the size is extremely large for the metal oxide particle, the film becomes loose and this may give rise to reduction in the strength. The amount of the fiber blended is more preferably from 15 to 50 mass %.

Furthermore, a dispersible silica (colloidal silica) or a dispersible alumina (alumina sol) may be contained in the solution. Such a particle is preferably an ultrafine particle having a particle diameter of 8 to 50 nm, more preferably from 9 to 30 nm. Also, the sol preferably has a pH of 5 or less, because when the metal oxide fine particle having a photocatalytic function is titanium oxide, the aggregation thereof can be prevented. When the content of the secondarily added metal oxide fine particle such as colloidal silica and alumina sol is 5 mass % or more based on the main component metal oxide particle, the film strength is enhanced. The amount blended of the secondarily added metal oxide fine particle is preferably 200 mass % or less, because if it exceeds 200 mass %, this may give rise to reduction in the film function. The content of the secondarily added metal oxide fine particle is more preferably from 10 to 90 mass %.

For the ceramic fiber or secondarily added metal oxide particle such as colloidal silica or alumina sol, an alkyl silicate may be partially polymerized under heat alone or together with a magnesium alkoxide, an aluminum alkoxide, a titanium alkoxide, an aluminum phosphate or a magnesium phosphate to prepare a metal oxide having a crosslinked structure and by decreasing the temperature or charging a reagent to interrupt the polymerization, a binder where the metal oxide is compounded with a ceramic fiber or with a highly film-formable fine particle such as colloidal silica or alumina sol may be obtained and blended in the coating material. Also, a ladder silicone may be separately obtained and added to provide the same effect as above. The ladder silicone may have a molecular weight of about 1,000 and be close to an oligomer or may have a molecular weight of tens of thousands.

At this time, an organic compound which does not dissolve in water may be used depending on the case and therefore, an organic solvent such as alcohol as represented by methanol, ethanol and isopropyl alcohol may be preferably used for the solvent. Furthermore, in order to stop the condensation and store the solution, an acetic acid or a compound having an acetylacetone or isocyanate structure may be blended.

In the case of effecting the polymerization under heat by using an alkyl silicate such as tetramethyl orthosilicate and tetraethyl orthosilicate alone or in the coexistence of ceramic fiber or metal alkoxide, the polymerization is preferably performed while maintaining the pH in the acidic region with use of a mineral acid. When the pH is from 1 to 3, the reaction is stabilized, but if the acidity is too strong, there arises a problem of corrosion when the obtained coating material is coated. Therefore, the pH is preferably from 2 to 3. Also, the polymerization is preferably performed by using the alkyl silicate in a concentration of 1 to 10 mass % in terms of silica. If the concentration at the polymerization is less than 1 mass %, the main component metal oxide is excessively diluted when the solution is blended as the binder, whereas if it exceeds 10 mass %, the polymerization reaction is difficult to control. The concentration of the alkyl silicate at the polymerization is more preferably from 2 to 6 mass %.

The polymerization temperature is preferably higher in view of production efficiency but in the case of intending to keep the small molecular weight and maintain the binder solution in a low viscosity, the polymerization is preferably allowed to proceed at a relatively low temperature of 30° C. to less than 50° C. At this time, the molecular weight is preferably from 1,000 to 2,000 in terms of PEG as measured by a gel permeation chromatograph (GPC) using tetrahydrofuran as the mobile phase.

The reaction temperature and the reaction time are in a trade-off relationship but, for example, when the reaction is performed at 40° C., it is preferred to set the reaction time to from 1 to 2 hours and stop the reaction by cooling the reaction system. At this time, the kinematic viscosity of the solution becomes from 1.0 to 2.0 cSt. On the contrary, in the case of forming a thick film by using the binder, the kinematic viscosity is preferably adjusted to 1.2 cSt or more by elevating the temperature or prolonging the reaction time as needed. The sample having such a high kinematic viscosity is elevated in the polymerization degree and therefore, advantageously strong against a stress as compared with those having a low molecular weight. However, if the kinematic viscosity exceeds 30 cSt, a non-uniform film is liable to result. Therefore, the kinematic viscosity is preferably 30 cSt or less.

These binders may be used as a mixture, irrespective of organic or inorganic binders, to enhance the properties of respective binders.

In the present invention, when an organic binder is used, a film having relatively good flexibility by itself can be formed. Examples thereof include one polymer compound selected from polyvinyl alcohol, melamine resin, celluloid, chitin, starch sheet, polyacrylamide, acrylamide, poly-N-vinylacetamide, N-vinylacetamide-sodium acrylate copolymer, N-vinylacetamide-acrylamide copolymer, poly-acrylamide, acrylamide-sodium acrylate copolymer, poly-N-vinylformamide, polytetrafluoroethylene, tetrafluoro-ethylene-polypropylene fluoride copolymer, tetrafluoro-ethylene-polyfluoro-alkyl vinyl ether copolymer, polyvinyl fluoride, polyvinylidene fluoride, styrene-butadiene copolymer, polyvinylpyridine, vinylpyridine-methyl methacrylate copolymer, polyvinylpyrrolidone, polyethylene oxide, urethane resin and acryl silicon resin, and a mixture of these polymer compounds. Among these, poly-N-vinylacetamide, polyacrylamide, N-vinylacetamide-sodium acrylate copolymer, acrylamide-sodium acrylate copolymer, polytetrafluoroethylene, urethane resin and acryl silicon resin are preferred in view of weather resistance. These binders may be used as a mixture, irrespective of organic or inorganic binders, to enhance the properties of respective binders.

A preferable means for increasing the coating layer thickness is a fluorine-containing resin, more preferably a combination of a fluorine-containing resin and an inorganic binder. The inorganic binder in this combination may be one or more of those as described before. The addition of a fluorine-containing resin has at least the following three advantageous aspects and redeems the defects of the inorganic binder and organic binder, brings appropriate properties and is very effective for use in the photocatalytic coating material.

First, the fluororesin has, as conventionally known, high weather resistance and durability high enough to withstand the strong oxidative force of titanium oxide. In the case of other organic binders, when the binder is blended and titanium oxide and coated to form a film, yellowing or choking of the entire coating film may occur depending on the environment because of its readily oxidizable property. On the other hand, when a fluorine-containing resin is added to an organic binder and blended, the weather resistance of the entire film is not inhibited.

Secondly, making good use of the properties of the fluorine-containing resin, the stress generated in the film by various factors is relieved. In general, when a film having a thickness of 1.0 µm or more is formed by using a coating agent through once coating without recoating, a stress is generated due to the non-uniformity of the composition in the film thickness direction and often causes cracking or the like in the drying process of the film, that is, at the time of drying the solvent, and this readily incurs reduction in the film strength. The reduction in the strength occurs also at the coating on a flat plate, but this phenomenon is outstanding when the substrate has a curved or uneven shape. On the other hand, when the fluorine-containing resin is added, the stress in the film can be relieved as described above and therefore, the coating material comprising a fluorine-containing resin is effective in forming a thick film.

Thirdly, elasticity and at the same time, high abrasion resistance can be imparted. When the strength is imparted only by the resin, abrasion sometimes occurs from the surface layer. In the present invention, a particle group H which is a metal oxide particle or a photocatalytic particle is blended at a preferred ratio and therefore, the film can have an appropriate hardness.

The fluorine-containing resin used in the present invention is not particularly limited but examples of the fluorine-containing resin which can be used include polytetrafluoroethylene, tetrafluoroethylene.perfluoropropylene copolymer, tetrafluoroethylene.perfluoroalkyl vinyl ether copolymer, tetrafluoroethylene.ethylene copolymer, polyvinylidene fluoride and polychlorotrifluoroethylene. Among these, polytetrafluoroethylene is preferred because those having various particle diameters are easily available and also from the economical aspect. The existence form of the fluorine-containing resin is not particularly limited and may be, for example, a powder form or a slurry-like dispersion, but when a dispersion obtained by highly dispersing the fluorine-containing resin with use of an anionic or nonionic surfactant or the like is used, the processing into a coating agent is facilitated and this is preferred. The coating material of the present invention can keep the strength even when the film thickness is increased, but a film of 1 μm or less is formed depending on the case. Therefore, the fluororesin added preferably has a particle size of giving d50 of 2 μm or less as measured by using the above-described laser scattering method. The particle size is more preferably 1 μm or less so that the fluororesin particle can be fit in the film, still more preferably 0.4 μm or less so that the fluororesin particle can intrude into the gap of the titanate oxide necking particle. The coating material comprising a fluororesin and a titanium oxide dispersion of the present invention is a coating material characterized by high dispersibility and high photocatalytic activity. The amount of precipitated components and the amount of solid contents are described below.

The solid content in the coating material is measured by weighing 100 g of the coating material in a beaker made of Pyrex™, placing it in a constant temperature dryer at 120° C. for 24 hours or more, and weighing the mass of the remaining solid contents. From the mass of solid contents, the solid content concentration of the coating material can be calculated.

The fluorine-containing resin originally first reaches the melting point when heated at 300° C. or more, for example, at 330° C. or more in the case of polytetrafluoroethylene, whereby a film can be formed. However, in the present invention, a sufficiently high film strength can be obtained even at a relatively low temperature of 200° C. or less. When the curing temperature is 200° C. or less, a film can be formed without impairing the properties of the toughened glass, or application on a general-purpose resin having moderate heat resistance, such as polyethylene terephthalate and polyethylene naphthalate, can be realized and therefore, the range of the substrate selection is remarkably widened. The mechanism that the film is cured at a temperature lower than the melting point of fluororesin is unclear, but the following two reasons are considered: (1) when titanium oxide for use in the present invention synthesized by a vapor or liquid phase process is used as the main component of the coating material, the surface thereof chemically or physically interacts with the fluororesin surface and this leads to the achievement of film strength; (2) at the film formation, heating is performed and during the heating, vaporization or the like of the solvent contained in the coating material occurs, as a result, the volume after drying is reduced to a fraction as compared with that immediately after the coating and at this time, since the particle group B is an ultrafine particle of about 10 nm, a strong cohesive force is generated due to the liquid bridge effect and this force brings about an effect as if the fluororesin is press-bonded, whereby the strength is achieved.

In order to allow for occurrence of this film curing effect, similarly to the above, the fluorine-containing resin is preferably a fine particle of 2 μm or less, more preferably 0.4 μm or less, but those of 0.01 μm or less are difficult to obtain.

Furthermore, the fluorine-containing resin is preferably present in a good dispersion state in the solution. In some cases, the fluorine-containing resin contained in the coating material must be dispersed by using a dispersant, and the dispersant used here may be any surfactant irrespective of anionic, nonionic or the like, but a nonionic surfactant is preferred. This is because when a nonionic surfactant is used, the fluorine-containing resin fine particles can be dispersed even if the amount of the surfactant added is relatively small and also because in the case of a nonionic surfactant, a surfactant capable of being volatilized at about 200° C. is known.

If the surfactant remains in the film, the activity of the surfactant may cause reduction in the film strength or adverse effect on the photocatalytic performance. Examples of the nonionic surfactant which can be used for dispersing the fluorine-containing resin in the present invention include sucrose fatty acid ester, sorbitan fatty acid ester, polyoxyethylene sorbitan fatty acid ester, ethylene oxide-propylene oxide copolymer, polyoxyethylene fatty acid ester, fatty acid alkanolamide, polyoxyethylene alkyl ether, alkyl glycoside, polyoxyethylene alkyl phenyl ether, polyoxyethylene alkyl ether, alkyl glycoside and polyoxyethylene fatty acid ester. Such a surfactant is preferably added in an amount of 0.5 to 10% based on the weight of the fluorine-containing resin blended. This surfactant may be blended directly to the coating material, but the dispersibility of the entire coating material can be enhanced by charging the fluorine-containing resin into a solution having previously dissolved therein the surfactant, dispersing the fluorine-containing resin, and blending the resulting solution in the coating material.

The purport of the present invention is to achieve both a sufficiently high film strength and a photocatalytic function and for this purpose, the solid content concentration in the coating material is preferably 10 mass % or more. In the case of intending to bring out particularly the photocatalytic performance, an excessive binder is not preferred and therefore, titanium oxide preferably occupies 50 mass % or more, more preferably 60 mass % or more, still more preferably 70 mass % or more, of the solid content. When the component blended for imparting the photocatalytic function to the film is blended in such a high ratio and when a thick film of 1 μm or more is intended to form, the film strength can be hardly maintained in conventional techniques. However, in the present invention, a necking particle group A, a particle group B, an inorganic binder and a fluorine-containing resin are used, whereby the film strength can be more enhanced. Assuming that the content of the inorganic binder out of the binders blended in the coating material is Iw [g] in terms of the 120° C.-dried solid matter and the content of the fluorine-containing resin is Fw [g] in terms of the 120° C.-dried solid matter, when Iw/Fw is from 0.05 to 20.0, a coating film having synergistic properties of both the inorganic binder and the fluororesin can be obtained. The Iw/Fw is more preferably from 0.2 to 3, still more preferably from 0.5 to 1.

As for the ratio of the binder contained in the coating material, one of the characteristic features of the present invention is in that the amount of the binder can be decreased in comparison with conventional coating materials as described above. However, when it is intended to impart higher strength and flexibility to the film, the above-described inorganic or organic binder can be blended. At this time, the ratio of the binder component to the solid content mass Z is preferably from 0.01 to 0.5. Furthermore, if the strength can be maintained, the amount of the binder component is preferably small so as to bring out the photocatalytic performance, and the ratio thereof is preferably from 0.01 to 0.4, more preferably from 0.1 to 0.35.

In view of coatability, a surfactant can also be appropriately added to the coating material. Examples of the surfactant used here include a condensed phosphate, a lignin sulfonate, a carboxymethyl cellulose, a naphthalene sulfonate-formalin condensate, a polyacrylate, an acrylic acid-maleate copolymer, an olefin-maleate copolymer, an alkyldiphenyl ether disulfonate, a dodecylbenzenesulfonic acid or a salt thereof, and a nonionic surfactant. Among these, a polyacrylic acid-based surfactant is preferred.

The amount of the surfactant used in the coating material is preferably such that the mass of the surfactant is from 5 to 2,000 ppm based on the entire mass of the coating material. If the amount of the surfactant is too small, slight staining may remain on the substrate or when the surface energy of the substrate is very small, liquid repellence or coating unevenness may be caused, whereas if the amount of the surfactant is too large, the surfactant may not only inhibit the binding of particles with each other and cause reduction in the film strength but also adsorb to the photocatalyst particle surface and inhibit the expression of catalytic performance. The amount of the surfactant is more preferably from 10 to 500 ppm.

As for the solvent used in the coating material, any material can be used without limitation as long as it is a volatile liquid capable of dispersing the particle groups A and B and at the same time, accelerating the mixing of metal oxide particle with binder by dispersing, dissolving or swelling the binder. Specifically, a volatile liquid having a hydroxyl group, a carboxyl group, a ketone group, an aldehyde group, an amino group or an amido group in its skeleton is preferred. For example, water, methanol, ethanol, propanol, butanol, methyl cellosolve, ethylene glycol, acetic acid, acetylacetone, terpine oil and methylpyrrolidone may be used as a single substance or a mixture thereof. Among these, when an aqueous solution containing 40 mass % or more of ethanol is used as the solvent, good wettability to various substrates is obtained. Furthermore, when the aqueous solution contains 50 mass % or more of ethanol, the drying rate can be increased and the productivity elevates. Also, when a solution obtained by adding 50 mass % or more of butanol to a volatile solvent having compatibility with butanol and containing alcohols, acetonitrile or the like is used as the solvent for the photocatalytic coating material, high viscosity at ordinary temperature and high affinity for various substrates are ensured, film formation can be performed by vaporizing the solvent in the vicinity of 100° C., and the coating material can be advantageously used for forming a film on an objective substrate by using a technique such as squeegee method or screen printing method.

In the present invention, particle groups A and B having good dispersibility in a solvent are used and therefore, the preparation and blending of the coating material involve no difficulty, but if desired, mixing with use of a ball mill, a bead mill, a paint shaker or the like may be performed. However, in order to bring out various effects provided in the present invention, a mixing method of not seriously destroying the necking structure of the particle group A is preferably employed. Specifically, a rotation-revolution kneader of less giving an impact to particles to destroy the necking structure or render the crystal surface amorphous is preferably used. Also, out of ultrasonic dispersers, a convection-type disperser where a solution to be dispersed is caused to flow in the vicinity of an oscillator and thereby the dispersion is accelerated, or an immersion-type disperser where an oscillator is immersed in a vessel containing a solution to be dispersed and thereby the dispersion is performed, may be used. At this time, the dispersion may be performed at any frequency of 28 kHz, 40 kHz and 100 kHz and may be performed by using a disperser of generating a mixture of these waves or alternately generating these waves.

At the film formation using the coating material, a method of coating the coating material by spray coating, spin coating, doctor blade coating, flow coating, roll coating or the like, removing the solvent by drying and when the binder is a thermosetting type, further heating the film may be used. The photocatalytic film obtained by spin coating or flow coating is dense and excellent in the see-through property and works as a clear coat of not impairing the design property of the substrate. On the other hand, the spray coating, doctor blade coating and roll coating can be used in industry. Particularly, the spray coating is preferred because the film can be continuously dried while coating the coating material and the film thickness can be controlled by the coating time or the amount sprayed per coating time.

In coating the solution of the present invention, when the following characteristic coating technique is used, the film can have stable strength even if the film thickness becomes large. A solution is prepared to give a moderate concentration such that the metal oxide fine particle concentration in the coating material becomes from 5 to 25 mass % (at this time, the metal oxide particle preferably contains a necking particle, that is, a particle group A), and the solution is coated on a substrate by flow coating or dip coating and dried at about 150° C.

After the coating of this thick film, a coating material comprising a particle group B and a binder and having a solid content concentration of ½ or less of that of the first-time coating material may be coated on the film and dried. The solid content concentration of this recoating material is preferably from 0.5 to 5 mass %.

When the particle size distribution is measured by a laser Doppler-type particle size distribution meter, the first-time coating material has two peaks, whereas the coating material for recoating has one peak. The number of peaks in the particle size distribution of the coating material used for the first-time coating is preferably larger than the number of peaks in the particle size distribution of the coating material for recoating.

As a result, the amount of the titanium oxide particle attached per unit area can be increased and at the same time, the film strength can be enhanced as compared with a thick film formed by one-layer coating. This is considered to result because the particle group B having good dispersibility penetrates into a gap generated at the time of forming a thick film and the gap is filled.

The drying and curing are preferably performed at a temperature of 75 to 500° C. The organic solvent component remaining in the film can be unfailingly volatilized by elevating the drying temperature, but if the film is heated to more than 500° C., the metal oxide particles start melt-bonding with each other and the film properties as a porous body cannot be satisfactorily maintained in some cases. The heating may be performed by using a hot plate, an electric furnace, a dryer, a desiccator or the like, but it is preferred to effect the curing by using a dryer or hot air convection-type desiccator capable of giving a sufficiently large quantity of heat at a constant temperature during the film formation. The hot air drying can realize the film formation by satisfactorily volatilizing the solvent at a temperature lower than the boiling point of the solvent, and this is a very useful method when the substrate is low in the heat resistance. The drying must be performed until the substrate temperature elevates to a temperature of causing volatiliz-ation of the solvent and thereby the solvent is volatilized without fail, and when a binder is contained, until the substrate temperature elevates to a temperature of causing curing of the binder and the curing reaction is completed. In general, an inorganic binder or an organic binder, whichever is used, the curing reaction is sufficient if the curing temperature is maintained for about 15 minutes after the temperature is elevated. Heating more than necessary may cause deterioration of the substrate or increase in the energy cost.

If the thickness of the film after drying and curing is less than 50 nm, the performance such as antifouling, deodorization and antibacterial effect cannot be satisfactorily exerted. Therefore, the film is preferably formed to a thickness of 50 nm or more. On the other hand, if the film thickness exceeds 2,000 nm, a sufficiently high film strength can be hardly obtained as described above and this is not preferred. In order to allow the necking of the particle group A to effectively work as a structure support or framework, the film thickness is preferably 5 times or less the aggregate particle diameter of the particle group A. The aggregate particle diameter of the particle group A may be larger than the average film thickness, but if the average film thickness is smaller than 1/3 times the aggregate particle diameter of the particle group A, the particle group A is too large for the film and readily comes off from the film. Therefore, the average film thickness is preferably 1/3 times or more the aggregate particle diameter of the particle group A.

The photocatalyst can decompose an organic material into water and carbon dioxide and therefore, is generally resistant to an organic material in an environment under light as compared with conventional catalysts. However, contamination by an inorganic material, that is, contamination by metal, nitrogen oxide or sulfur oxide is sometimes not removed but remains even when oxidized on the photocatalyst surface, and adversely affects the photocatalytic performance. Particularly, nitrogen oxide and sulfur oxide are present in a large amount in air as inorganic contents, $NO_3^-$ or $S_4^{2-}$ is stably adsorbed to titanium oxide, and the sulfur oxide is not volatilized at all, as a result, these are accumulated on the titanium oxide surface in aging.

The poisoned titanium oxide can hardly adsorb a material originally intended to decompose. The decomposition of an organic compound occurs after the matrix is adsorbed to titanium oxide and if the adsorption site is covered by a poisoning substance, the performance seriously decreases. The coating material of the present invention was adjusted to a titanium oxide concentration of 1 mass %, coated on a 7.5 cm-square (56.25 cm$^2$) glass plate and dried, the glass plate was placed in 5 L of a gas containing 50 ppm of a contamination source and being adjusted to 20° C. and a humidity of 50%, the position was adjusted to give 10,000 lux at the sample position when light was irradiated from the outside by using a fluorescent lamp "Mellow-white" manufactured by Toshiba Lighting & Technology Corporation, and a contamination test was performed for 12 hours. A sample not subjected to contamination, a sample contaminated with NO and a sample contaminated with $SO_2$ each was placed in 500 ml of a gas adjusted to 20° C., a humidity of 50% and 500 ppm of acetaldehyde, and irradiated with light from the outside by using "Mellow-white" to give 10,000 lux at the glass sample position. The change in aging of the acetaldehyde gas concentration was observed by using gas chromatography.

TABLE 1

| | Acetaldehyde Gas Removal Ratio | | | |
|---|---|---|---|---|
| | Before Contamination | After NO Contamination | After SO$_2$ Contamination | Washing after SO$_2$ Contamination |
| Removal ratio [%] | 40% | 41% | 14% | 42% |

As seen in Table 1 the performance was seriously decreased only in a sample contaminated with $SO_2$. When these samples were washed with water, it was found that the acetaldehyde decrease curve was the same as that of the sample not subjected to contamination. The water used for washing the sample was measured by ion chromatography, as a result, the elution amount of $SO_4^{2-}$ reached 1 mass % based on the sample titanium oxide and this reveals that contamination to this concentration occurred at a moderate estimate. From these results, it was verified that the performance decreases by the contamination with sulfur oxide. Also, in the case of $SO_2$ contained in air, it is presumed that accumulation of sulfur oxide poisoning occurs in the form of $SO_4^{2-}$ on the titanium oxide surface in aging. Also in an actual environment, when the decomposition of acetaldehyde was confirmed after the photocatalyst was coated on a sample and left standing in a place opened to air for about 2 months under irradiation of strong light of about 15,000 lux, the deodorization performance was decreased. This sample was subjected to an analysis in the depth direction by XPS, as a result, contamination with a sulfur compound at a uniform concentration in the entire film was confirmed. When an elution test was performed, contamination with $SO_4^{2-}$ at a concentration of around 1 mass % based on titanium oxide was confirmed.

In addition, when the substrate contains an ion of relatively light metal or allows for the presence of a contamination source such as sulfur compound, contamination occurs not only from air but also from the substrate side, though the effect of these substances is unclear as compared with the sulfur compound.

The measures for abatement of this contamination are roughly classified into three techniques, that is, first is to increase the amount of the film attached per unit area and thereby decrease the contamination concentration, second is to trap contamination-causing substances (by using undercoat or chemical/physical means), and third is to expel contaminants outside (by using catalyst, water washing or platinum).

As for the first measure, it seems easy to increase the amount attached, but this is difficult in practice. Since titanium oxide has a strong oxidative force under light irradiation, in the case where weather resistance over several years is required, the photocatalytic coating film must be formed of inorganic material-dominated components which are not degraded despite occurrence of oxidation. At this time, when the film thickness is large for the hardness attributable to the inorganic component, a stress is sometimes generated at the drying due to non-uniformity of concentration and causes cracking or the like to give rise to decrease in the strength. Furthermore, when the substrate has flexibility, this film formed of a general inorganic component readily undergoes reduction in the film strength even by slight distortion. The film comprising a particle group A and a particle group B of the present invention tends to maintain the strength even when the film thickness is made large, as compared with normal coating materials having a particle size distribution with one peak. Also, as described above, an artificial glass fiber, a rockwool, a slug wool or the like may be deployed like reinforcement for concrete. In addition, an alkyl silicate alone or compounded with a ceramic fiber or metal alkoxide may be partially polymerized by the method described above, and a binder may be prepared by using a minimum amount of the obtained sample. At this time, the amount of the film attached may also be increased by using a sample having a viscosity of which elevation can be confirmed. A coating material compounded with a fluorine-containing resin may also be added in a minimum amount.

From the standpoint of diluting contaminants, a metal fine particle having no photocatalytic function may be blended in a certain amount based on the photocatalyst particle. More specifically, a technique of using, for example, fine particulate silica or alumina having high hydrophilicity and a large specific surface area per weight may be employed, so that the concentration of contamination with sulfur oxide or the like in titanium oxide can be distributed or dispersed to the additive. The sample added preferably has a center particle diameter of 5 nm to 3 μm, and considering film formability and cost, more preferably from 8 nm to 1 μm. In particular, fine particulate silica is preferred for dispersing the concentration of contaminants, because those having a specific surface area exceeding 1,000 m$^2$/g are available. When the cost, adsorption and dispersion are also taken account of, the specific surface area is preferably from 300 to 1,000 m$^2$/g. Also, some colloidal silica and alumina sol have excellent film formability as compared with fine particulate titanium oxide and therefore, it is possible to increase the amount of the film attached per unit area by using such a substance and thereby decrease the contaminant concentration in the film.

In order to achieve a thick film and a high film strength by the coating, as described above, a thick film is primarily coated and a coating material in an amount of 0.5 to 2 mass % as the solid content is overcoated thereon and dried, whereby a film having higher strength can be formed.

The second measure for contamination includes a method of adsorbing or fixing contaminants onto an additive and thereby preventing poisoning on the photocatalyst particle surface.

For trapping contaminants by physical adsorption and thereby preventing poisoning on the photocatalyst surface, a substance having high adsorption capacity, such as active alumina, A-type zeolite, Y-type zeolite and activated carbon, can be used. Among these, active alumina is preferred in view of color tone, easy availability of fine particle product, volume of sulfur oxide adsorbed, and the like. Such a physical adsorbent is preferably blended in an amount of 10 to 200 mass % based on the photocatalyst fine particle so as to enhance the poisoning resistance of film. In the case where the initial photocatalytic performance is important, the physical adsorbent is preferably blended to a concentration of 5 to 150 mass % based on the photocatalyst fine particle. The concentration of the physical adsorbent is more preferably from 20 to 50 mass %. If desired, the physical adsorbent may be ground into a particle diameter of 5 nm to 5 μm by using a ball mill, a bead mill, a rocking mill, a paint shaper or the like, and this is preferred because the film formability is enhanced. The method for fixing contaminants includes a method of effecting unionization as a chemical substance. This is hereinafter called a chemical trapping agent. For example, fine particulate transition metal oxide, copper oxide, iron oxide, manganese oxide or zinc oxide has a strong activity of trapping sulfur oxide. Also, a compound, particularly chloride, of alkaline earth metal, such as magnesium chloride anhydride, magnesium chloride hexahydrate, calcium chloride anhydride, calcium chloride dihydrate, strontium chloride, strontium chloride hexahydrate, barium chloride anhydrate and barium chloride dihydrate, turns into a sparingly soluble sulfate in the presence of sulfate ion and therefore, the sulfate ion can be prevented from adsorption to the photocatalyst particle surface. In the case where the coating material is alkaline, the alkaline earth metal salt added may be a carbonate or hydrogencarbonate of the metal exemplified above. Such a chemical trapping agent is water-soluble in the chloride state and dissolves in a certain amount also in some organic solvents such as alcohol, so that the coating and film formation can be performed at one time in the state of the chemical trapping agent being added to the photocatalytic coating material and mixed with the photocatalyst particle. The additive can also be imparted to the photocatalyst particle surface by a method where a photocatalytic coating material not containing the additive is coated and film-formed and then a water or organic solvent having dissolved or dispersed therein the alkaline earth metal compound is overcoated thereon and film-formed. In the case where the photocatalytic coating film must be fired and cured at a high temperature of 100° C. or more, if the film is heated to such a high temperature in the state of the alkaline earth metal being contained, the photocatalyst particle which is a highly reactive nano-size particle sometimes reacts with the alkaline earth metal ion to cause reduction in the performance. Therefore, when a high temperature is necessary for the curing of film, a method of coating a photocatalytic coating material free from a chemical trapping agent and then coating a chemical trapping agent as an overcoat thereon is effective.

The amount added of such a physical adsorbent or chemical trapping agent varies depending on the environment in which the photocatalyst is used as well as the time period for which the effect must be maintained. In an environment of allowing for washing of the photocatalyst coating film with rainwater or the like once or more per month, the contamination by the poisoning inorganic material is washed out and therefore, the chemical trapping agent or physical adsorbent may be used in a small amount. On the contrary, in an environment subject to strong contamination with sulfur oxide or the like, for example, when the photocatalyst is disposed on a road having a lot of traffic or in the vicinity of a furnace of burning a gas containing much sulfur and when washing with water such as rainwater cannot be expected, the physical adsorbent or chemical trapping agent must be used in a larger amount. Also, in the case of applying the photocatalyst to a place directly irradiated with sunlight, in the vicinity of lighting or to the lighting itself, the oxidation of contamination gas on the photocatalyst surface proceeds at a high speed due to a large quantity of light and the contamination with sulfur oxide or the like is seriously accumulated. Therefore, a larger amount of additive is necessary. Furthermore, in order to maintain the photocatalytic effect for a long time in such an environment prone to accumulation of contamination, a larger amount of physical adsorbent or chemical trapping agent is necessary. When the amount of the fine particulate copper oxide, iron oxide, manganese oxide or zinc oxide or the alkaline earth metal compound blended in the coating material is 0.01 mass % or more in terms of the metal based on the photocatalyst particle, the effect can be obtained in such environments. The amount blended is preferably 200 mass % or less, because if it exceeds 200 mass %, the photocatalytic performance may be impaired. In order to fully bring out the initial performance, the amount blended is preferably from 1 to 50 mass % based on the photocatalyst particle. This value is governed by the required life of photocatalytic performance and the environment in which the photocatalyst is used, but in a model specification that light of 0.1 mW/cm$^2$ or more as measured by an ultraviolet actinometer of integrally determining the quantity of ultraviolet light at a wavelength of 310 to 390 nm is irradiated for 12 hours/day and that the SOx concentration is 50 ppb and the photocatalyst life is 1 year or more, the amount of the additive blended is preferably from 5 to 20 mass %. The alkaline earth metal blended in the photocatalytic coating material may be a simple substance or a mixture of two or more compounds which are dissolved or dispersed.

At the time of removing contaminants by using a physical adsorbent or chemical trapping agent, the film composition need not have a uniform component concentration. The component for trapping contaminants may have a concentration gradient in the thickness direction or may be localized by using it as an overcoat or undercoat. For example, when the contamination is known to be of external origin, as described above, the physical adsorbent or chemical trapping agent may be overcoated after previously forming the photocatalyst coating film. On the contrary, when the contaminant is known to come from the substrate, the photocatalytic film may be formed after the physical adsorbent or chemical trapping agent is processed into an undercoat material and then coated and film-formed. In the case where the physical adsorbent or chemical trapping agent has a certain adverse effect on the photocatalytic performance, when the photocatalytic component and such a trapping agent are unevenly distributed in the film, the initial photocatalytic performance is sometimes rather elevated and this is preferred.

The third measure for contaminants include a technique of discharging the contaminants out of the film. An easiest method is water washing. When the contaminants are accumulated, the film with the substrate is washed with water to dissolve out inorganic poisoning substances. However, when the portion applied with the photocatalyst becomes unusable by water, such as electronic device, or when the portion has a huge size, the water cannot be freely applied. Therefore, a technique of removing contaminants from the photocatalytic film by not using water washing is necessary.

The photocatalytic semiconductor is mainly used for oxidative decomposition in many cases, but this photocatalyst also has a photoreduction activity and is known to reduce water to a hydrogen gas with use of a cocatalyst in combination, though the reaction speed is very low. In the present invention, platinum metal, nickel metal, nickel oxide, cobalt oxide and molybdenum oxide were taken notice of and studies were made by adding these to the photocatalyst particle. A glass plate sample coated with a coating material having added thereto such a transition metal or an oxide thereof was forcedly contaminated with sulfur oxide and examined, as a result, the performance could be prevented from decreasing as compared with those where the transition metal or an oxide thereof was not added. The amount added of the transition element metal or an oxide thereof is preferably from 0.1 to 200 mass % based on the photocatalyst fine particle. Some oxides are colored and when the decorative property is required, the amount added of such an oxide must be adjusted to 0.1 to 1 mass % based on the photocatalyst particle. Also, some oxides dissolve out depending on the solvent or pH used as the coating material and in such a case, the pH of the solvent may be rendered alkaline from weakly acidic by using ammonia, phosphate, carbonate, or the like. In order to more successfully bring out the effect, a platinum metal or a compound thereof is preferred among the transition metals, and by compounding therewith, a nickel oxide, a cobalt oxide and a molybdenum oxide are preferably used. As for the blending ratio of the platinum metal to other transition metal oxide, the amount of the other transition metal oxide is preferably from 20 to 10,000 mass % based on the platinum metal. Considering that the platinum metal is expensive, for bringing out the effect while reducing the amount of platinum metal as much as possible, the transition metal oxide is preferably used in an amount of 100 to 900 mass %, more preferably from 300 to 600 mass %, based on the platinum metal. The sum of platinum metal and transition metal oxide is, as described above, preferably from 0.1 mass % to less than 200 mass %, more preferably from 0.5 to 1 mass %, based on the photocatalyst fine particle. However, in an environment where water washing is not performed for a long time of 1 year or more and the contamination degree is high, the sum is preferably from 5 to 100 mass %. In view of dispersibility in the coating material, the platinum or a compound thereof and the transition metal oxide added are preferably a fine particle of 10 µm or less, more preferably 5 µm or less.

The photocatalytic film formed from the coating material in a preferred embodiment of the present invention has functions such as deodorization, antifouling and antibacterial effect. In general, as for the deodorization, the amount of the substance which should be decomposed is large as compared with antifouling and antibacterial effect, and a high reaction rate and a large catalytic amount are required. In this meaning, the coating material of the present invention capable of giving a thick film while maintaining high strength as compared with conventional products is very preferred as a coating material of imparting a deodorizing function. Also, the photocatalytic film obtained from the coating material of the present invention is largely characterized by high durability against contamination originated in air or substrate. The coating material in a preferred embodiment of the present invention is coated on a substrate such as various materials and shaped articles, whereby a photocatalytic film can be formed on the substrate surface. When the substrate has a filter shape, the substrate coated with the coating material of the present invention can be effectively used for air purification and this is preferred. Furthermore, when the filter is combined with a light source to fabricate a device and the quantity of ultraviolet light at the filter position is 0.05 mW/cm$^2$ or more in terms of the integral value in the region from 310 to 390 nm, it is particularly effective to impart contamination resistance performance to the photocatalytic film as in the present invention, because tremendous accumulation of contaminants occurs in the photocatalytic film per light irradiation time. The decomposition performance for volatile organic compounds is obvious at the initial stage after installing the filter, but since the performance is higher as the quantity of light is larger, the quantity of ultraviolet light at the filter position is usually designed to 0.1 mW/cm$^2$ or more. That is, the coating material of the present invention is very effective for prolonging the contamination resistance and life of endurance of the filter with photocatalyst. As for the substrate, almost all of ceramic, glass, metal, plastic, wood, paper and the like can be used without limitation. When a catalyst support comprising an alumina, zirconia or the like is used as the substrate and the titanium oxide thin film catalyst is loaded thereon, this can be used as a catalyst. Also, when a glass, plastic cover or the like of lighting equipment such as fluorescent lamp is used as the substrate and the titanium oxide thin film is formed thereon, the film can maintain the transparency and by virtue of its photocatalytic activity, can decompose organic materials such as lamp black without shielding light and this is effective for preventing fouling of the glass or cover. Furthermore, when the titanium oxide thin film is formed on a glass or a wall material for construction, the film can prevent fouling and therefore, can be used for window or wall materials of a high-rise building or the like and since a cleaning operation is not necessary, the building management cost can be reduced.

Examples of the article imparted with such a photocatalytic function include building material, lighting equipment, decorative windowpane, machine, vehicle, glass product, home appliance, agricultural material, electronic device, cellular phone, tool, tableware, bath goods, water purifying apparatus, toilet goods, furniture, clothing, cloth product, fiber, leather product, paper product, resin product, sporting goods, bedding, container, spectacle, billboard, piping, wiring, metal fitting, hygiene material, automobile equipment, stationery, emblem, hat, bag, shoe, umbrella, window shade, balloon, illumination, fluorescent lamp, LED, signal, street light, toy, road sign, ornament, outdoor product such as tent and cooler box, artificial flower, objet d'art, and filter, particularly filter for deodorization.

The present invention can also be applied to environment purifying equipment-devices which are effective, for example, for eliminating the sick-house problem, decomposing organic chlorine compounds such as PCB and dioxins in water, air and soil, or decomposing residual pesticides or endocrine-disrupting chemicals in water and soil. At this time, the coating material can be used by film-forming it on the article. Among the articles described above, when the present invention is applied particularly to a fluorescent lamp, the photocatalytic particle comes to be present in the vicinity of the light source and can obtain a very large luminous energy. The fluorescent lamp is widespread in almost all homes, offices, stores and the like and therefore, the present invention can greatly contribute to reduction in the concentration of organic and inorganic materials adversely affecting the indoor environment. In addition, when the present invention is applied to a water purifying apparatus, the photocatalytic film formed of the coating material of the present invention has a very strong oxidizing power and therefore, is optimal for decomposing trace organic impurities contained in water.

Examples of the light source allowing for effective expression of photocatalytic property or hydrophilicity of the article include sunlight, fluorescent lamp, incandescent lamp, mercury lamp, xenon lamp, halogen lamp, mercury xenon lamp, metal halide lamp, light-emitting diode, laser, and combustion flame of organic material. Examples of the fluorescent lamp include, but are not limited to, fluorescent lamp with ultraviolet absorbing film, white fluorescent, daylight white fluorescent lamp, daylight fluorescent lamp, warm white fluorescent lamp, bulb color fluorescent lamp and black light.

The coating material of the present invention can be applied not only as a photocatalytic film but also to the formation of a dielectric film, a photoelectrode film of dye-sensitized solar cell, an UV-shielding film, a corrosion-preventing film, a weather resistance-imparting film or the like. When the coating material of the present invention having blended therein necking particles is used, by virtue of its high strength and high crystallinity, a titanium-containing perovskite-type oxide film having small leakage current and excellent electrical properties can be formed, and a thin-film formation such as thin-film dielectric porcelain, dielectric film and dielectric coating necessary for a small capacitor of making it possible to downsize electronic devices can be shaped. Furthermore, the necking particle has high crystallinity, good electron conductivity, appropriate porosity as electrode, and strong strength and therefore, the coating material of the present invention is very useful as a porous electrode body for forming an industrial oxidized electrode or reduced electrode or a positive or negative electrode for small primary or secondary batteries, particularly, an electrode on the dye adsorption side of a dye-sensitized solar cell. Not limited to these uses, the coating material in a preferred embodiment of the present invention is small in the amount of binder and assures high film strength and therefore, when used as a coating film of metal oxide, the functions of the metal oxide can be maximally expressed and a film fulfilling functions of, for example, shielding ultraviolet light, preventing corrosion and imparting weather resistance can be shaped.

EXAMPLES

The metal oxide dispersion is described in greater detail below by referring to Examples and Comparative Examples, but the present invention is not limited thereto.

(Deodorization Test Method)

A glass sample (20 cm×20 cm) coated with a coating material was tested on the deodorization of acetaldehyde gas as follows.

Two glass samples for light irradiation and for blank (dark place) were prepared. The glass sample and an air containing 20 vol ppm of acetaldehyde gas were enclosed in a 5 liter-volume Tedlar® bag (manufactured by GL Sciences Inc.). One sample was irradiated from the outside by a daylight white fluorescent lamp (Mellow-white®, manufactured by Toshiba Lighting & Technology Corporation) to give 10,000 lux, and another sample was kept in a dark place. After the passing of 1 hour, the acetaldehyde concentration in the Tedlar® bag was measured by a gas detector tube (92 L, manufactured by Gastec Corporation), and the ratio of the gas decreased with respect to the initial concentration of 20 ppm was defined by the value of gas removal ratio [%].

(Film Strength Test Method A)

A glass sample (20 cm×20 cm) coated with a coating material was tested on the film strength by the following method.

A glass sample coated with a photocatalyst was unmovably fixed on a rubber plate and rubbed with a dry hand while applying a load of about 5 kg.

(Film Strength Test Method B)

A pencil scratch test according to JIS-K5400 was performed.

(Synthesis of Liquid-Phase Grown Particle)

Figure 3:
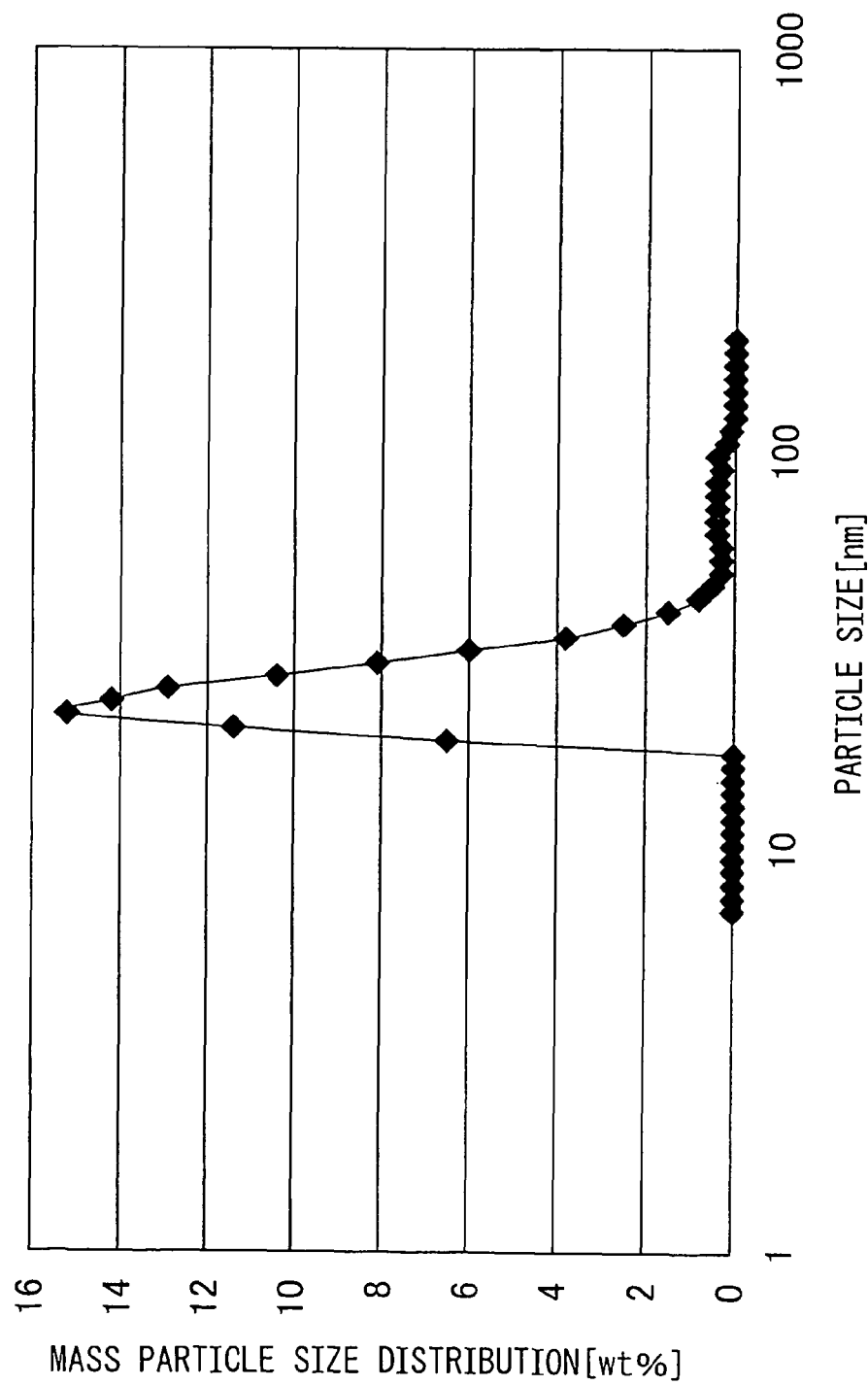
FIG. 3 is a mass particle size distribution of liquid-phase grown particles.

9.1 L of distilled water was charged into a reaction tank with a reflux condenser, heated to 95° C. and kept at this temperature. While maintaining the stirring rate at about 200 rpm, 0.9 L of an aqueous titanium tetrachloride solution (Ti content: 16.5 mass %, specific gravity: 1.52, produced by Sumitomo Titanium Corp.) was added dropwise to the reaction tank at a rate of about 10 mL/min. At this time, the operation was carefully performed to prevent the reaction solution from dropping of the temperature. As a result, the titanium tetrachloride concentration in the reaction tank became 0.5 mol/L (4 mass % in terms of titanium oxide). In the reaction tank, the reaction solution turned white turbid immediately after the dropwise addition, but the temperature was kept as-is. After the completion of dropwise addition, the temperature was elevated and the reaction solution was kept at a temperature (101° C.) in the vicinity of the boiling point for 60 minutes. The obtained sol was washed with pure water by using an ultrafiltration membrane (Microsa ACP-1050, produced by Asahi Kasei Chemicals Corporation, pore size: about 6 nm) until the conductivity of the washing solution became 100 µS/cm and then concentrated to give a solid content concentration of 15 mass % when dried at 120° C. The particle size distribution was measured by a laser Doppler-type particle size distribution meter according to the method described above and found to have a peak at 22 nm as shown in FIG. 3. The BET specific surface area of the obtained solid content was measured by a BET specific surface area meter (Flow Sorb 2300, manufactured by Shimadzu Corporation) and found to be 150 m$^2$/g. The average primary particle diameter calculated from this value based on formula (2) was found to be about 10 nm. Also, this solid content was ground in an agate mortar and subjected to measurement by powder X-ray diffraction. The measuring apparatus used was Rigaku-Rint Ultima+. The measurement was performed by using CuKα1 as the X-ray source under the conditions such that the output was 40 kV-40 mA, the divergence slit was ½°, the divergence vertical limiting slit was 10 mm, the scattering slit was ½°, and the light-receiving slit was 0.15 mm. The X-ray diffraction pattern was measured under FT condition with a scanning step of 0.04° and a measurement time of 25 seconds. When the obtained X-ray pattern was analyzed by using the Rietvelt method described above, the powder was found to be a brookite crystal-containing titanium oxide powder containing 75 mass % of brookite crystal, 20 mass % of anatase crystal and 5 mass % of rutile crystal. The dry powder ground in an agate mortar was measured for the tap density by using a powder tester PT-D (manufactured by Hosokawa Micron Corporation) according to the method described in JIS K-5101-20.2, as a result, the tap density P was 1.2 g/cm$^3$. The number m of necking particles in this powder obtained by the liquid-phase process was calculated based on formula (1) assuming that the true density ρ of titania is 4.0 g/cm$^2$, and found to be 3.2. Also, when the powder was observed by a transmission electron microscope (JEM-200CX, manufactured by JEOL), the primary particle diameter was about 10 nm.

(Confirmation of Reduction in Performance Due to Contamination)

The coating material prepared was coated on a 7.5 cm-square glass plate and dried, the glass plate was placed in 5 L of a gas containing 50 ppm of $SO_2$ and being adjusted to 20° C. and a humidity of 50%, the position was adjusted to give 10,000 lux at the sample position when light was irradiated from the outside by using a fluorescent lamp "Mellow-white" manufactured by Toshiba Lighting & Technology Corporation, and a contamination test was performed for 12 hours.

A sample not subjected to contamination and a sample contaminated as above each was placed in 500 ml of a gas adjusted to 20° C., a humidity of 50% and 500 ppm of acetaldehyde, and irradiated with light from the outside by using "Mellow-white" to give 10,000 lux at the glass sample position. The percentage decrease in the acetaldehyde gas concentration after four hours was measured by using gas chromatography.

Example 1

(1.1) Synthesis of Particle Group A-1

A titanium tetrachloride-containing gas obtained by mixing gaseous titanium tetrachloride of 4.7 Nm$^3$/hour (N means the normal state, hereinafter the same) and nitrogen of 16 Nm$^3$/hour, and an oxidative gas obtained by mixing air of 20 Nm$^2$/hour and water vapor of 25 Nm$^3$/hour were preheated to 1,100° C. and 1,000° C., respectively, and then introduced into a reaction tube at a flow velocity of 92 m/sec and 97 m/sec, respectively, by using a coaxial parallel flow nozzle. The inner tube diameter of the coaxial parallel flow nozzle was 20 mm, and the titanium tetrachloride-containing gas was introduced into the inner tube.

The inner diameter of the reaction tube was 100 mm, and the flow velocity within the reaction tube at a reaction temperature of 1,250° C. was 13 m/sec as a calculated value. After the reaction, a cooling air was introduced into the reaction tube to adjust the high-temperature residence time within the reaction tube to be 0.2 seconds. Thereafter, the ultrafine particle powder was collected by using a Teflon™-made bag filter.

The obtained fine particulate titanium oxide was analyzed by RIETAN-2000 according to the method described above and found to contain 92% of anatase-type crystal and 8% of rutile-type crystal. Also, when the obtained fine particulate titanium oxide was measured by the laser diffraction-type particle size distribution measuring method, the 90% cumulative mass-particle size distribution diameter D90 in the particle size distribution was 2 μm, and D50 was 1.3 μm. The n value by the Rosin-Rammler formula was 1.9. Here, three-point data D10, D50 and D90 obtained in the laser diffraction were plotted on the RR chart as R=90%, 50% and 10%, respectively, and the n value was determined from an approximate straight line drawn on these 3 points.

The specific surface area of the obtained vapor-phase grown titanium oxide was measured by the BET method and found to be 98 m$^2$/g. The primary particle diameter determined from this specific surface area value according to formula (2) was 15 nm. The tap density was 0.12 g/cm$^3$, and the m calculated based on formula (1) was 19,500.

(1.2) Preparation of Coating Material (Inorganic Binder)

Figure 4:
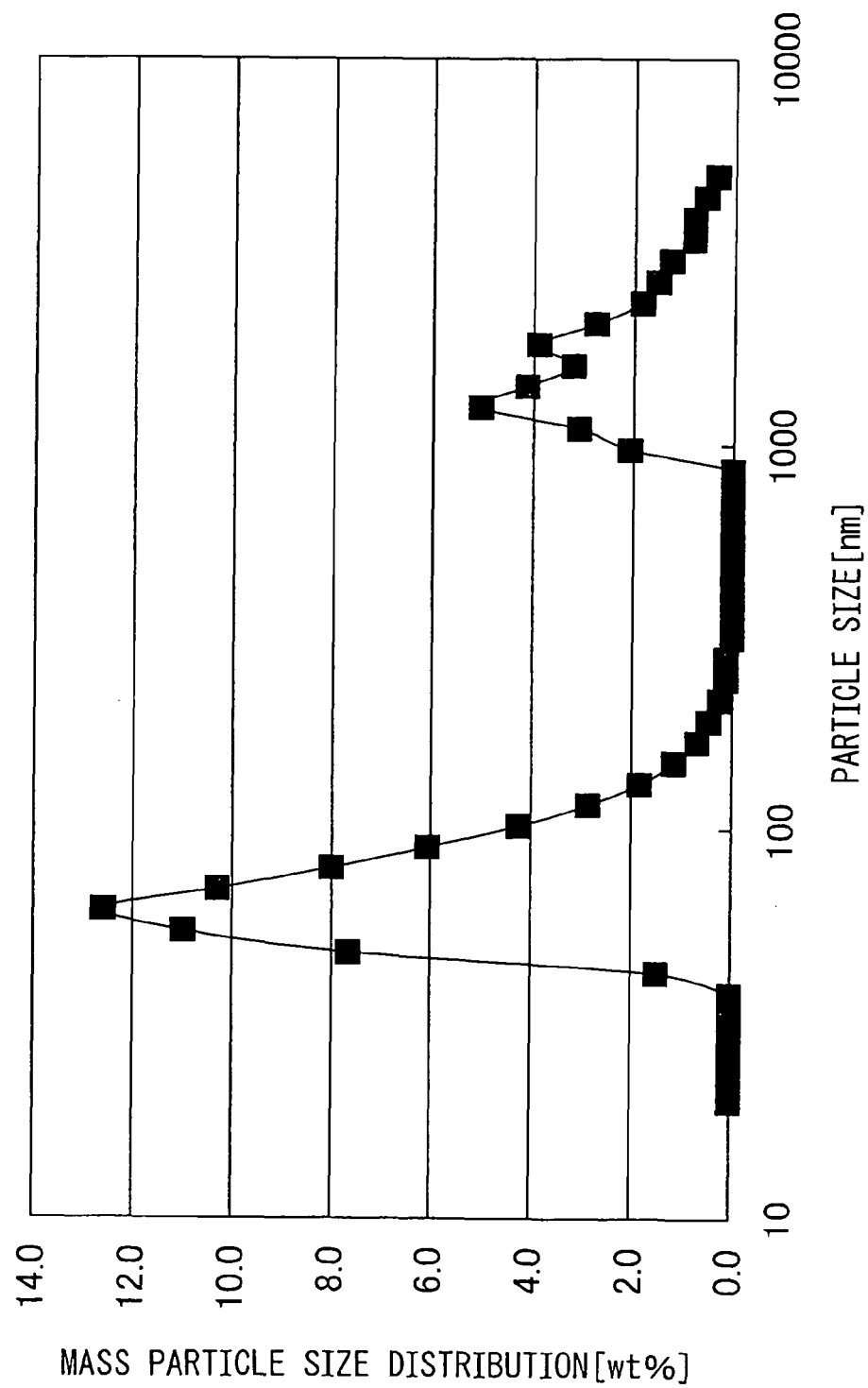
FIG. 4 is a mass particle size distribution of the coating material in Example 1 (1.2) of the present invention.

Into a Pyrex-made vessel, 30 g of the sol obtained in (Synthesis of Liquid-Phase Grown Particle) was charged as the particle group B. Subsequently, 5 g of water, 10 g of an aqueous zirconium hydroxychloride solution (8 mass % in terms of zirconium oxide), 55 g of alcohol and 0.5 g of Particle Group A-1 synthesized in (1.1) were added thereto and thoroughly mixed. The resulting mixture with the vessel was treated in a desktop-type ultrasonic washer for 30 minutes while water-cooling the vessel to obtain a coating material. The thus-obtained coating material was measured by using a laser Doppler-type particle size distribution meter, and the results are shown in FIG. 4. Peaks of the mass particle size distribution were present at 62 nm and 1,260 nm, the area of peak at 62 nm was 69%, and the area of peak at 1,260 nm was 31%. When the coating material was measured by the laser diffraction method, a mass particle size distribution having one peak at 2.6 μm was observed. Also, the produced coating material was dried, and the average primary particle diameter was determined from the BET specific surface area of the resulting powder and found to be 11 nm.

The coating solution produced above was dropped on a 20 cm-square clean glass plate until one surface was thoroughly wetted and after holding the glass plate upright for about 1 hour to drain off the solution, the coating solution was cured for 15 minutes in a constant-temperature dryer kept at 150° C., as a result, an almost colorless transparent film was obtained.

(1.3) Preparation of Coating Material (Organic Binder)

Into a Pyrex™-made vessel, 30 g of the sol obtained in (Synthesis of Liquid-Phase Grown Particle) was charged as the particle group B. Subsequently, 55 g of water, 15 g of water dispersion-type urethane resin (VONDIC 1040NS, produced by Dai-Nippon Ink & Chemicals, Inc., urethane resin: 20 mass % as solid) and 0.5 g of Particle Group A-1 synthesized in (1.1) were added thereto and thoroughly mixed to obtain a coating material. The thus-obtained coating material was measured by using a laser Doppler-type particle size distribution meter, as a result, peaks were present at 120 nm and 2,110 nm, the area of peak at 120 nm was 61%, and the area of peak at 2,110 nm was 39%. When the coating material was measured by the laser diffraction method, a mass particle size distribution having one peak at 2.8 μm was observed. Also, the produced coating material was dried, and the average primary particle diameter was determined from the BET specific surface area of the resulting powder and found to be 11 nm. The coating solution produced above was dropped on a 20 cm-square clean glass plate until one surface was thoroughly wetted and after holding the glass plate upright for about 1 hour to drain off the solution, the coating solution was cured for 15 minutes in a constant-temperature dryer kept at 120° C.

(1.4) Evaluation of Photocatalytic Film

The glass plate samples obtained in (1.2) and (1.3) were subjected to (Deodorization Test), (Strength Test A) and (Strength Test B), and the results are shown in the Table 2.

Example 2

(2.1) Synthesis of Particle Group A-2

A titanium tetrachloride-containing gas obtained by mixing gaseous titanium tetrachloride of 9.4 Nm$^3$/hour and nitrogen of 6 Nm$^3$/hour, and an oxidative gas obtained by mixing oxygen of 10 Nm$^3$/hour and water vapor of 30 Nm$^3$/hour were each preheated to 1,000° C. and then introduced into a reaction tube at a flow velocity of 63 m/sec and 73 m/sec, respectively, by using a coaxial parallel flow nozzle. The inner tube diameter of the coaxial parallel flow nozzle was 20 mm, and the titanium tetrachloride-containing gas was introduced into the inner tube.

The inner diameter of the reaction tube was 100 mm, and the flow velocity within the reaction tube at a reaction temperature of 1,310° C. was 13 m/sec as a calculated value. After the reaction, a cooling air was introduced into the reaction tube to adjust the high-temperature residence time within the reaction tube to be 0.2 seconds. Thereafter, the ultrafine particle powder was collected by using a Teflon™-made bag filter.

The obtained ultrafine particulate titanium oxide had a BET specific surface area of 26 m$^2$/g and a primary particle diameter of 60 nm and contained 80% of anatase-type crystal and 20% of rutile-type crystal. Also, when the obtained fine particulate titanium oxide was measured by the laser diffraction-type particle size distribution measuring method, the 90% cumulative mass-particle size distribution diameter D90 in the particle size distribution was 0.82 µm, and D50 was 0.56 µm. The n value by the Rosin-Rammler formula was 2.6, and the tap density P was 0.28. The number m of necking particles calculated from these values based on formula (1) was 57.

(2.2) Preparation and Film Formation of Coating Material (Inorganic Binder)

The preparation and film formation of the coating material were performed in the same manner as in (1.2) except for changing Particle Group A-1 to Particle Group A-2 synthesized in (2.1). The coating material obtained was measured by using a laser Doppler-type particle size distribution meter, as a result, peaks of the mass particle size distribution were present at 73 nm and 1,140 nm, the area of peak at 73 nm was 64%, and the area of peak at 1,140 nm was 36%. When the coating material was measured by the laser diffraction method, a mass particle size distribution having one peak at 2.2 µm was observed. Also, the produced coating material was dried, and the average primary particle diameter was determined from the BET specific surface area of the resulting powder and found to be 12 nm.

(2.3) Preparation and Film Formation of Coating Material (Organic Binder)

The preparation and film formation of the coating material were performed in the same manner as in (1.3) except for changing Particle Group A-1 to Particle Group A-2 synthesized in (2.1). The coating material obtained was measured by using a laser Doppler-type particle size distribution meter, as a result, peaks of the mass particle size distribution were present at 140 nm and 2,200 nm, the area of peak at 140 nm was 62%, and the area of peak at 2,200 nm was 38%. When the coating material was measured by the laser diffraction method, a mass particle size distribution having one peak at 2.5 µm was observed. Also, the produced coating material was dried, and the average primary particle diameter was determined from the BET specific surface area of the resulting powder and found to be 12 nm.

(2.4) Evaluation of Photocatalytic Film

The glass plate samples obtained in (2.2) and (2.3) were subjected to (Deodorization Test), (Strength Test A) and (Strength Test B), and the results are shown in the Table 2.

Example 3

(3.1) Synthesis of Particle Group A-3

A gas containing gaseous titanium tetrachloride of 11.8 Nm$^2$/hour at a concentration of 100%, and a mixed gas containing oxygen of 8 Nm$^2$/hour and water vapor of 20 Nm$^3$/hour were each preheated to 1,000° C. and then introduced into a reaction tube at a flow velocity of 49 m/sec and 60 m/sec, respectively, by using a coaxial parallel flow nozzle. The inner tube diameter of the coaxial parallel flow nozzle was 20 mm, and the titanium tetrachloride-containing gas was introduced into the inner tube.

The inner diameter of the reaction tube was 100 mm, and the flow velocity within the reaction tube at a reaction temperature of 1,320° C. was 10 m/sec as a calculated value. After the reaction, a cooling air was introduced into the reaction tube to adjust the high-temperature residence time within the reaction tube to be 0.3 seconds or less. Thereafter, the fine particle powder produced was collected by using a Teflon™-made bag filter.

The obtained fine particulate titanium oxide had a BET specific surface area of 16 m$^2$/g and a primary particle diameter of 90 nm and contained 80% of anatase-type crystal and 20% of rutile-type crystal. Also, when the obtained fine particulate titanium oxide was measured by the laser diffraction-type particle size distribution measuring method, the 90% cumulative mass-particle size distribution diameter D90 in the particle size distribution was 0.80 µm, and D50 was 0.56 µm. The n value by the Rosin-Rammler formula was 2.8, and the tap density P was 0.32. The number m of necking particles calculated from these values based on formula (1) was 19.

(3.2) Preparation and Film Formation of Coating Material

The preparation and film formation of the coating material were performed in the same manner as in (1.2) except for changing Particle Group A-1 to Particle Group A-3 synthesized in (3.1). The coating material obtained was measured by using a laser Doppler-type particle size distribution meter, as a result, peaks of the mass particle size distribution were present at 65 nm and 1,100 nm, the area of peak at 65 nm was 70%, and the area of peak at 1,100 nm was 30%. When the coating material was measured by the laser diffraction method, a mass particle size distribution having one peak at 2.0 µm was observed. Also, the produced coating material was dried, and the average primary particle diameter was determined from the BET specific surface area of the resulting powder and found to be 12 nm.

(3.3) Preparation and Film Formation of Coating Material (Organic Binder)

The preparation and film formation of the coating material were performed in the same manner as in (1.3) except for changing Particle Group A-1 to Particle Group A-2 synthesized in (3.1). The coating material obtained was measured by using a laser Doppler-type particle size distribution meter, as a result, peaks of the mass particle size distribution were present at 120 nm and 2,810 nm, the area of peak at 120 nm was 71%, and the area of peak at 2,810 nm was 29%. When the coating material was measured by the laser diffraction method, a mass particle size distribution having one peak at 2.1 μm was observed. Also, the produced coating material was dried, and the average primary particle diameter was determined from the BET specific surface area of the resulting powder and found to be 12 nm.

(3.4) Evaluation of Photocatalytic Film

The glass plate samples obtained in (3.2) and (3.3) were subjected to (Deodorization Test), (Strength Test A) and (Strength Test B), and the results are shown in the Table 2.

Comparative Example 1

(4.1) Film Formation Using Only Particle Group A

Water (25 g) was charged into a Pyrex-made vessel and subsequently, 5 g of Particle Group A-1, 10 g of an aqueous zirconium hydroxychloride solution (8 mass % in terms of zirconium oxide) and 55 g of alcohol were added thereto and thoroughly mixed to obtain a coating material. This coating solution was dropped on a 20 cm-square clean glass plate until one surface was thoroughly wetted and after holding the glass plate upright for about 1 hour to drain off the solution, the coating solution was cured for 15 minutes in a constant-temperature dryer kept at 150° C. When the coating material was measured by using a laser Doppler-type particle size distribution meter, one peak of the mass particle size distribution was observed at 1,300 nm.

(4.2) Preparation of Coating Material (Organic Binder)

Water (80 g) was charged into a Pyrex-made vessel and subsequently, 5 g of Particle Group A-1 and 15 g of water dispersion-type urethane resin (VONDIC 1040NS, produced by Dai-Nippon Ink & Chemicals, Inc., urethane resin: 20 mass % as solid) were added thereto and thoroughly mixed to obtain a coating material. This coating solution was dropped on a 20 cm-square clean glass plate until one surface was thoroughly wetted and after holding the glass plate upright for about 1 hour to drain off the solution, the coating solution was cured for 15 minutes in a constant-temperature dryer kept at 120° C. When the coating material was measured by using a laser Doppler-type particle size distribution meter, one peak of the mass particle size distribution was observed at 2,200 nm.

(4.3) Evaluation of Photocatalytic Film

The glass plate samples obtained in (3.2) and (3.3) were subjected to (Deodorization Test), (Strength Test A) and (Strength Test B), and the results are shown in the Table.

Comparative Example 2

(5.1) Film Formation Using Only Particle Group B

Particle Group B (33 g) obtained in (Synthesis of Liquid-Phase Grown Particle) was charged into a Pyrex-made vessel and thereto, 2 g of water, 10 g of an aqueous zirconium hydroxychloride solution (8 mass % in terms of zirconium oxide) and 55 g of alcohol were added and thoroughly mixed to obtain a coating material. This coating material was measured by using a laser Doppler-type particle size distribution meter and found to have one peak of the mass particle size distribution at 90 nm. When the coating material was measured by the laser diffraction method, a broad distribution having no distinct peak at 0.2 to 2.0 μm was observed. This coating solution was dropped on a 20 cm-square clean glass plate until one surface was thoroughly wetted and after holding the glass plate upright for about 1 hour to drain off the solution, the coating solution was cured for 15 minutes in a constant-temperature dryer kept at 150° C.

(5.2) Preparation of Coating Material (Organic Binder)

Particle Group B (33 g) obtained in (Synthesis of Liquid-Phase Grown Particle) was charged into a Pyrex-made vessel and thereto, 52 g of water and 15 g of water dispersion-type urethane resin (VONDIC 1040NS, produced by Dai-Nippon Ink & Chemicals, Inc., urethane resin: 20 mass % as solid) were added and thoroughly mixed to obtain a coating material. This coating material was measured by using a laser Doppler-type particle size distribution meter and found to have one peak of the mass particle size distribution at 160 nm. When the coating material was measured by the laser diffraction method, a broad distribution having no distinct peak at 0.2 to 2.6 μm was observed. This coating solution was dropped on a 20 cm-square clean glass plate until one surface was thoroughly wetted and after holding the glass plate upright for about 1 hour to drain off the solution, the coating solution was cured for 15 minutes in a constant-temperature dryer kept at 120° C.

(5.3) Evaluation of Photocatalytic Film

The glass plate samples obtained in (5.1) and (5.2) were subjected to (Deodorization Test), (Strength Test A) and (Strength Test B), and the results are shown in the Table.

Example 4

Coating Material Containing PTFE

(6.1) Preparation of Coating Material

Into a Pyrex-made vessel, 70 g of the particle group obtained in (Synthesis of Liquid-Phase Grown Particle) was charged. Subsequently, 12 g of water, 12 g of an aqueous zirconium hydroxychloride solution (concentration: 15 mass % in terms of zirconium oxide), 4 g of a 0.25 μm polytetrafluoroethylene dispersion (AD911, produced by Asahi Glass Company, Ltd., concentration: 60 mass % in terms of powder solid content concentration), 1 g of an aqueous 1 mass % dodecylbenzenesulfonic acid solution, and 1.0 g of Particle Group A-1 synthesized in (1-1) were added thereto and thoroughly mixed to obtain a coating material.

(6.2) Film Formation of Coating Material

The coating solution obtained above was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(6.3) Evaluation of Photocatalytic Film

The glass plate sample obtained in (6.2) was subjected to (Confirmation of Reduction in Performance due to Contamination), (Strength Test A) and (Strength Test B), and the results are shown in Table 3.

Example 5

Twice Coating of Coating Materials Differing in Particle Size Distribution (7.1) Preparation of Coating Material Into a Pyrex-made vessel, 46.7 g of the sol obtained in (Synthesis of Liquid-Phase Grown Particle) was charged as the particle group B. Subsequently, 1.3 g of water, 6 g of an aqueous zirconium hydroxychloride solution (20 mass % in terms of zirconium oxide), 40 g of alcohol, and 5 g of Particle Group A-1 synthesized in (1.1) were added thereto and thoroughly mixed. The resulting mixture with the vessel was treated in a desktop-type ultrasonic washer for 30 minutes while water-cooling the vessel to obtain a coating material.

(7.2) Preparation of Coating Material for Overcoating

Into a Pyrex-made vessel, 10 g of the particle group obtained in (Synthesis of Liquid-Phase Grown Particle) was charged. Subsequently, 15.8 g of water, 2.2 g of an aqueous zirconium hydroxychloride solution (concentration: 10 mass % in terms of zirconium oxide), 70 g of alcohol, and 1 g of an aqueous 1 mass % dodecylbenzenesulfonic acid solution were added thereto and thoroughly mixed to obtain a coating material.

(7.3) Film Formation of Coating Material

The coating solution obtained in (7.1) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C. After the coating film was allowed to cool to room temperature, the coating solution for overcoating obtained in (7.2) was dropped thereon until the coating film was thoroughly wetted and after holding the coating film upright for about 1 hour to drain off the solution, the coating solution was cured for 15 minutes in a constant-temperature dryer kept at 150° C.

(7.4) Evaluation of Photocatalytic Film

The glass plate sample obtained in (7.4) was subjected to (Confirmation of Reduction in Performance due to Contamination), (Strength Test A) and (Strength Test B), and the results are shown in Table 3.

Example 6

(8.1) Coating Material Containing Active Alumina (8.1) Preparation of Coating Material Into a Pyrex-made vessel, 16 g of the sol obtained in (Synthesis of Liquid-Phase Grown Particle) was charged as the particle. Subsequently, 8.7 g of water, 4.5 g of an aqueous zirconium hydroxychloride solution (10 mass % in terms of zirconium oxide), 70 g of alcohol, 0.4 g of active alumina (KC-501, produced by Sumitomo Chemical Co., Ltd.), and 0.4 g of Particle Group A-1 synthesized in (1.1) were added thereto. The resulting mixture with the vessel was treated in a desktop-type ultrasonic washer for 30 minutes while water-cooling the vessel to obtain a coating material.

(8.2) Film Formation of Coating Material

The coating solution obtained in (8.1) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(8.3) Evaluation of Photocatalytic Film

The glass plate sample obtained in (8.2) was subjected to (Confirmation of Reduction in Performance due to Contamination), (Strength Test A) and (Strength Test B), and the results are shown in Table 3.

Example 7

Coating Material Containing Chemical Trapping Agent (9.1) Preparation of Coating Material Into a Pyrex-made vessel, 16 g of the sol obtained in (Synthesis of Liquid-Phase Grown Particle) was charged as the particle. Subsequently, 8.7 g of water, 4.5 g of an aqueous zirconium hydroxychloride solution (10 mass % in terms of zirconium oxide), 70 g of alcohol, 0.4 g of calcium chloride dihydrate (guaranteed, produced by produced by Kanto Chemical Co., Inc.), and 0.4 g of Particle Group A-1 synthesized in (1.1) were added thereto. The resulting mixture with the vessel was treated in a desktop-type ultrasonic washer for 30 minutes while water-cooling the vessel to obtain a coating material.

(9.2) Film Formation of Coating Material

The coating solution obtained in (9.1) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(9.3) Evaluation of Photocatalytic Film

The glass plate sample obtained in (9.2) was subjected to (Confirmation of Reduction in Performance due to Contamination), (Strength Test A) and (Strength Test B), and the results are shown in Table 3.

Example 8

Coating Material Containing Platinum and Transition Metal Oxide

(10.1) Preparation of Additive

Into a 100-ml vessel for rocking mill, 0.08 g of nickel oxide (guaranteed, produced by Kanto Chemical Co., Inc.), 0.12 g of cobalt oxide (first class, produced by Kanto Chemical Co., Inc.) and 0.6 g of molybdenum oxide (guaranteed, produced by Kanto Chemical Co., Inc.) were charged. Subsequently, 13.6 g of water, 2.0 g of an aqueous 1 mass % dodecylbenzenesulfonic acid solution and 20 g of 0.2 mm-diameter zirconia balls were added thereto. Then, these were dispersed by using a rocking mill at 600 rpm for 3 hours.

(10.2) Preparation of Coating Material

Into a Pyrex-made vessel, 16 g of the sol obtained in (Synthesis of Liquid-Phase Grown Particle) was charged as the particle. Subsequently, 70 g of alcohol and hexachloroplatinic acid hexahydrate in an amount of 0.2 mass % in terms of platinum metal based on titanium oxide were added and thoroughly mixed. This sample was placed in a Petri dish having a diameter of 12 cm, the Petri dish was covered and while stirring with a magnetic stirrer, light of a high-pressure mercury lamp was irradiated from the outside for 2 hours to give an ultraviolet light quantity of 20 $mW/cm^2$ as an integral value at a wavelength of 310 to 390 nm, so that platinum metal could be deposited on the titanium oxide surface by utilizing the photoreduction activity of titanium oxide. To this titanium oxide sol attached with platinum, a 8.2 g portion of the slurry sample prepared in (10.1) was added and then 4.5 g of an aqueous zirconium hydroxychloride solution (10 mass % in terms of zirconium oxide) was added. Furthermore, 0.4 g of Particle Group A-1 synthesized in (1.1) was added thereto and thoroughly stirred. The resulting mixture with the vessel was treated in a desktop-type ultrasonic washer for 30 minutes while water-cooling the vessel to obtain a coating material.

(10.3) Film Formation of Coating Material

The coating solution obtained in (10.2) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(10.4) Evaluation of Photocatalytic Film

The glass plate sample obtained in (10.3) was subjected to (Confirmation of Reduction in Performance due to Contamination), (Strength Test A) and (Strength Test B), and the results are shown in Table 3.

Example 9

Coating Material Containing Ceramic Fiber and Partial Hydrolysate of Alkoxysilane

(11.1) Preparation of Binder

Tetraethyl orthosilicate (7 g) was dissolved in 38 g of an aqueous 80 mass % ethanol solution, and 5 g of a cotton-like 4 μm-diameter quartz glass fiber cut into 0.5 mm was added. The resulting solution was kneaded in a rotation-revolution kneader for 30 minutes, adjusted to a pH of 2 by the addition of nitric acid and kept at 40° C. for 4 hours with stirring to allow the proceeding of polymerization, whereby a binder solution was obtained. The kinematic viscosity of this solution was 8.0 cSt.

(11.2) Preparation of Coating Material

Into a Pyrex-made vessel, 43 g of the sol obtained in (Synthesis of Liquid-Phase Grown Particle) was charged as the particle. Subsequently, 1 g of Particle Group A-1 synthesized in (1.1) and 1.0 g of an aqueous 1 mass % dodecylbenzenesulfonic acid solution were added thereto. The resulting mixture with the vessel was treated in a desktop-type ultrasonic washer for 30 minutes while water-cooling the vessel. The solution obtained was further mixed with the entire amount of the binder prepared in (11.1) to obtain a coating material.

(11.3) Film Formation of Coating Material

The coating solution obtained in (11.2) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(11.4) Evaluation of Photocatalytic Film

The glass plate sample obtained in (11.3) was subjected to (Confirmation of Reduction in Performance due to Contamination), (Strength Test A) and (Strength Test B), and the results are shown in Table 3.

Comparative Example 3

(12.1) Film Formation Only by Particle Group B (Low Concentration)

Into a Pyrex-made vessel, 6.7 g of the particle group obtained in (Synthesis of Liquid-Phase Grown Particle) was charged. Subsequently, 1.5 g of an aqueous zirconium hydroxychloride solution (10 mass % in terms of zirconium oxide), 90.8 g of water, and 1 g of an aqueous 1 mass % dodecylbenzenesulfonic acid solution were added thereto and thoroughly mixed to obtain a coating material.

(12.2) Film Formation of Coating Material

The coating solution obtained in (12.1) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(12.3) Evaluation of Photocatalytic Film

The glass plate sample obtained in (12.2) was subjected to (Confirmation of Reduction in Performance due to Contamination), (Strength Test A) and (Strength Test B), and the results are shown in Table 3.

Comparative Example 4

(13.1) Film Formation Only by Particle Group B (High Concentration)

Into a Pyrex-made vessel, 87 g of the particle group obtained in (Synthesis of Liquid-Phase Grown Particle) was charged. Subsequently, 9.8 g of an aqueous zirconium hydroxychloride solution (20 mass % in terms of zirconium oxide), 2.2 g of water, and 1 g of an aqueous 1 mass % dodecylbenzenesulfonic acid solution were added thereto and thoroughly mixed to obtain a coating material.

(13.2) Film Formation of Coating Material

The coating solution obtained in (12.1) was dropped on a 7.5 cm-square clean glass plate until one surface was thoroughly wetted and after holding the glass plate upright for about 1 hour to drain off the solution, the coating solution was cured for 15 minutes in a constant-temperature dryer kept at 150° C.

(13.3) Evaluation of Photocatalytic Film

The glass plate sample obtained in (13.2) was subjected to (Confirmation of Reduction in Performance due to Contamination), (Strength Test A) and (Strength Test B), and the results are shown in Table 3.

TABLE 2

Evaluation Results of Photocatalytic Film

| | Inorganic Binder | | | | Organic Binder | | | |
|---|---|---|---|---|---|---|---|---|
| | Gas Removal Ratio under Fluorescent Lamp [%] | Gas Removal Ratio in Dark Place [%] | Strength Test A | Strength Test B | Gas Removal Ratio under Fluorescent Lamp [%] | Gas Removal Ratio in Dark Place [%] | Strength Test A | Strength Test B |
| Example 1 | 100 | 15 | good | 4H | 90 | 5 | good | H |
| Example 2 | 90 | 10 | good | 4H | 75 | 10 | good | F |
| Example 3 | 70 | 10 | fair | 3H | 60 | 5 | fair | HB |
| Comparative Example 1 | 80 | 15 | not good | H | 75 | 10 | not good | 4B |
| Comparative Example 2 | 65 | 5 | fair | 4H | 50 | 5 | fair | 3B |

TABLE 3

Contamination resistance and coating layer strength

| | Gas Removal Ratio before contamination [%] | Gas Removal Ratio after contamination [%] | Strength Test A | Strength Test B |
|---|---|---|---|---|
| Example 4 | 92 | 76 | good | 3H |
| Example 5 | 98 | 79 | good | 3H |
| Example 6 | 67 | 59 | good | 2H |
| Example 7 | 55 | 52 | good | 3H |
| Example 8 | 57 | 55 | good | 2H |
| Example 9 | 85 | 66 | good | 3H |
| Comparative Example 3 | 30 | 11 | good | 4H |
| Comparative Example 4 | 70 | 51 | not good | H |

The invention claimed is:

1. A coating material for forming a photocatalytic film, comprising a particle group A, a particle group B and a solvent, wherein the particles of group A are titanium oxide, the number of necking particles of the particle group A is larger than the number of necking particles of the particle group B, wherein "the number of necking particles" here is referred to the total number of particles constituting all necking particles with each constituting particle being considered as the unit particle, wherein in the mass particle size distribution by the laser Doppler method, the particle group B has a peak at 8 to 400 nm, and the particle group A has a peak at 800 to 5,500 nm, and wherein the ratio X/Y of the mass X of the particle group A to the dry mass Y of the particle group B is from 0.01 to 0.2.

2. The coating material according to claim 1, wherein the particle group A has a necking structure formed by connection of m particles and the particle group B has only 0.2 m or less connected particles.

3. The coating material according to claim 2, wherein the average primary particle diameter of the particle group A is from 7 to 200 nm in terms of the BET specific surface area-reduced value.

4. The coating material according to claim 1, wherein in the particle size distribution of the particle group A, the distribution constant by the Rosin-Rammler formula is 1.5 or more.

5. The coating material according to claim 1, wherein the average particle diameter of the particle group A is from 50 nm to 3 μm as measured by using a laser diffraction-type particle size distribution meter.

6. The coating material according to claim 1, wherein the particle group A comprises titanium oxide synthesized by a vapor phase process of oxidizing titanium tetrachloride with an oxidative gas at a high temperature.

7. The coating material according to claim 1, wherein the particle group A comprises ultrafine particulate titanium oxide obtained by reacting a titanium tetrachloride-containing gas and an oxidative gas after preheating each gas at 500° C. or more and the ultrafine particulate titanium oxide has an average primary particle diameter of 7 to 500 nm in terms of the BET specific surface area-reduced value.

8. The coating material according to claim 1, wherein the average primary particle diameter of the particle group B is from 4 to 100 nm in terms of the BET reduced value.

9. The coating material according to claim 8, wherein the average particle diameter of the particle group B is from 4 to 2,000 rim as measured by a laser diffraction-type particle size distribution meter.

10. The coating material according to claim 9, wherein the average particle diameter of the particle group B is from 8 to 100 run as measured by a laser Doppler-type particle size distribution meter.

11. The coating material according to claim 8, wherein the particle group B comprises titanium oxide synthesized by hydrolyzing an aqueous titanium compound solution in water.

12. The coating material according to claim 1, wherein assuming that the mass of the particle group A is X, the dry mass of the particle group B is Y and the mass of the entire coating material is Z, the solid content concentration (X+Y)/Z is from 0.005 to 0.1.

13. A coating material according to claim 1, comprising a titanium oxide synthesized by a vapor phase process of oxidizing titanium tetrachloride with an oxidative gas at a high temperature, a titanium oxide synthesized by hydrolyzing an aqueous titanium compound solution in water, and a solvent.

14. The coating material according to claim 13, wherein the ratio of the dry mass between the titanium oxide synthesized by a vapor phase process of oxidizing titanium tetrachloride with an oxidative gas at a high temperature and the titanium oxide synthesized by hydrolyzing an aqueous titanium compound solution in water is from 0.01 to 0.2.

15. The coating material according to claim 1, which contains an inorganic binder, and which contains a zirconium compound in the inorganic binder.

16. A coating material according to claim 1 capable of forming a photocatalytic film having b/a of 0.5 or more with the assumption that when the coating material is coated in an area of 56.25 cm$^2$ and the coating film is contaminated under irradiation with light of 10,000 lux at 20° C. and a relative humidity of 50% for 12 hours in 5 L of an SO$_2$ gas diluted with air to 50 ppm, and then subjected to an acetaldehyde gas removal test at 20° C. and a relative humidity of 50% in 500 ml of a gas containing 500 ppm of acetaldehyde, the removal ratios before and after contamination are a % and b %, respectively.

17. The coating material according to claim 1, wherein a photocatalytic fine particle is contained, and a physical adsorbent comprising active alumina, A-type zeolite, Y-type zeolite or active carbon is blended in an amount of 10 to 200 mass % based on the photocatalytic fine particle.

18. The coating material according to claim 17, wherein the active alumina, A-type zeolite, Y-type zeolite or active carbon has a particle diameter of 5 nm to 5 μm.

19. The coating material according to claim 1, wherein a photocatalytic fine particle is contained, and one or more member selected from the group consisting of a copper oxide, an iron oxide, a manganese oxide and a zinc oxide is contained in an amount of 0.01 to 200 mass % in terms of the metal based on the photocatalytic fine particle.

20. The coating material according to claim 1, wherein a photocatalytic fine particle is contained, and one or more member selected from the group consisting of an alkaline earth metal chloride, an alkaline earth metal carbonate and an alkaline earth metal hydrogencarbonate is contained in an amount of 0.01 to 200 mass % in terms of the metal based on the photocatalytic fine particle.

21. The coating material according to claim 1, wherein a photocatalytic fine particle is contained, and a chloride of calcium, strontium or barium is contained in an amount of 0.01 to 200 mass % in terms of the metal based on the photocatalytic fine particles.

22. The coating material according to claim 1, which a photocatalytic fine particle is contained, and at least one selected from the group consisting of a nickel oxide, a cobalt oxide and a molybdenum oxide is contained in an amount of 0.1 to 200 mass % based on the photocatalyst particle.

* * * * *

UNITED STATES PATENT AND TRADEMARK OFFICE
CERTIFICATE OF CORRECTION

PATENT NO. : 7,833,340 B2
APPLICATION NO. : 11/578937
DATED : November 16, 2010
INVENTOR(S) : Yasuaki Wakizaka, Masayuki Sanbayashi and Jun Tanaka Page 1 of 1

It is certified that error appears in the above-identified patent and that said Letters Patent is hereby corrected as shown below:

On the title page add item (60),

Related U.S. Application Data

Provisional Application No. 60/567,008, filed May 3, 2004.
Provisional Application No. 60/604,488, filed August 26, 2004.

Signed and Sealed this
Twenty-sixth Day of July, 2011

David J. Kappos
*Director of the United States Patent and Trademark Office*